United States Patent
Li et al.

(10) Patent No.: US 12,155,464 B2
(45) Date of Patent: Nov. 26, 2024

(54) COMMUNICATION METHOD, APPARATUS, AND SYSTEM

(71) Applicant: HUAWEI TECHNOLOGIES CO., LTD., Shenzhen (CN)

(72) Inventors: Hancheng Li, Shanghai (CN); Han Zhou, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 17/885,744

(22) Filed: Aug. 11, 2022

(65) Prior Publication Data

US 2022/0393784 A1 Dec. 8, 2022

Related U.S. Application Data

(63) Continuation of application No. PCT/CN2020/121650, filed on Oct. 16, 2020.

(30) Foreign Application Priority Data

Feb. 14, 2020 (CN) .......................... 202010092659.X

(51) Int. Cl.
*H04J 3/06* (2006.01)
*H04W 56/00* (2009.01)

(52) U.S. Cl.
CPC .......... *H04J 3/0682* (2013.01); *H04J 3/0655* (2013.01); *H04W 56/001* (2013.01); *H04W 56/005* (2013.01)

(58) Field of Classification Search
CPC ... H04J 3/0682; H04J 3/0655; H04W 56/001; H04W 56/005
See application file for complete search history.

(56) References Cited

U.S. PATENT DOCUMENTS

| | | | |
|---|---|---|---|
| 10,965,392 B2 * | 3/2021 | Regev | H04J 3/0667 |
| 11,051,321 B2 * | 6/2021 | Moon | H04W 56/0015 |
| 11,153,838 B1 * | 10/2021 | Thota | H04W 56/0015 |
| 11,503,557 B2 * | 11/2022 | Aijaz | H04W 56/007 |
| 2012/0008646 A1 | 1/2012 | Fourcand | |

(Continued)

FOREIGN PATENT DOCUMENTS

| | | |
|---|---|---|
| CN | 108011682 A | 5/2018 |
| CN | 109155788 A | 1/2019 |

(Continued)

OTHER PUBLICATIONS

Canadian Office Action issued in corresponding Canadian Application No. 3,170,870, dated Sep. 8, 2023, pp. 1-3.

(Continued)

*Primary Examiner* — Bailor C Hsu
(74) *Attorney, Agent, or Firm* — HAUPTMAN HAM, LLP

(57) ABSTRACT

A communication method includes receiving, by a terminal device, first clock source information. The first clock source information corresponds to clock source information of a wireless communication system. The first clock source information indicates that a fifth generation (5G) system clock is useable as a clock source. The method further includes sending, by the terminal device, the first clock source information to an adjacent device.

17 Claims, 10 Drawing Sheets

(56) References Cited

U.S. PATENT DOCUMENTS

| | | | |
|---|---|---|---|
| 2016/0170437 A1* | 6/2016 | Aweya | H04B 10/071 |
| | | | 713/503 |
| 2017/0288972 A1* | 10/2017 | Li | H04L 41/082 |
| 2019/0007151 A1* | 1/2019 | Goel | H04W 56/0015 |
| 2019/0173596 A1 | 6/2019 | Chen et al. | |
| 2019/0190635 A1 | 6/2019 | Goel et al. | |
| 2022/0039040 A1* | 2/2022 | Nair | H04W 12/06 |
| 2022/0046570 A1* | 2/2022 | Moon | H04J 3/0644 |
| 2022/0361128 A1* | 11/2022 | Singh | H04W 56/001 |
| 2023/0262624 A1* | 8/2023 | Abreu | H04W 56/0015 |
| | | | 370/350 |

FOREIGN PATENT DOCUMENTS

| | | |
|---|---|---|
| CN | 110213007 A | 9/2019 |
| JP | 2021507613 A | 2/2021 |
| WO | 2019071598 A1 | 4/2019 |
| WO | 2019214810 A1 | 11/2019 |
| WO | 2020170460 A1 | 8/2020 |

OTHER PUBLICATIONS

Japanese Office Action issued in corresponding Japanese Application No. 2022-548105, dated Aug. 15, 2023, pp. 1-15.

CMCC, "Support for Accurate Reference Timing Delivery", 3GPP TSG-RAN WG3 #102 R3-186625, Spokane, WA, USA, Nov. 12-16, 2018, Total 6 Pages.

ZTE,"Item#1: Adding the Time conversion between 5G clock and TSN clock", SA WG2 Meeting #S2-136AH S2-2000538, Jan. 13-17, 2020, Incheon, South Korea, total 3 pages.

IEEE Std 1588-2019, IEEE Standard for a Precision Clock Synchronization Protocol for Networked Measurement and Control Systems; IEEE Instrumentation and Measurement Society, Total 499 Pages.

Huawei et al.,"Solution of time synchronization", SA WG2 Meeting #129 S2-1811022, Oct. 15-19, 2018, Dongguan, P.R. China, Total 5 Pages.

Samsung, "Updates on Solution for Uplink Synchronization", SA WG2 Meeting #136 AH S2-2000818, Jan. 13-17, 2020, Incheon, Korea, total 7 pages.

IEEE Std 802.1AS-2020, IEEE Standard for Local and Metropolitan Area Networks—Timing and Synchronization for Time—Sensitive Applications, Total 421 Pages.

Tencent, "AF Requested TSN Synchronization Activation and Deactivation", SA WG2 Meeting #S2-136AH S2-2000459, Jan. 13-17, 2020, Incheon, South Korea, Total 5 Pages.

3GPP TS 23.501 V16.3.0 (Dec. 2019), 3rd Generation Partnership Project; Technical Specification Group Services and System Aspects; System architecture for the 5G System (5GS); Stage 2(Release 16), 417 pages.

3GPP TS 38.331 V15.8.0 (Dec. 2019), 3rd Generation Partnership Project; Technical Specification Group Radio Access Network; NR;Radio Resource Control (RRC) protocol specification(Release 15), total 532 pages.

India Office Action issued in corresponding India Application No. 202217041386, dated Feb. 1, 2023, pp. 1-8.

International Search Report issued in corresponding International Application No. PCT/CN2020/121650, dated Jan. 15, 2021, pp. 1-8.

Chinese Office Action issued in corresponding Chinese Application No. 202010092659.X, dated Nov. 30, 2021, pp. 1-12.

Ericsson et al., "Merger of soln11 .3 and Soln 28", 3GPP TSG-SA WG2 Meeting #132 S2-1904716, Xi"an, China, Aeril 8-12, 2019, Total 13 Pages.

Ericsson et al., "proposal of merge (Solution11 option3 and solution28)", 3GPP TSG-SA WG2 Meeting #132 S2-1903372, Apr. 5-12, 2019, total 9 pages.

3GPP Draft; 23.734 V16.2.0,"3rd Generation Partnership Project Technical Specification Group Services and System Aspects; Study on enhancement of 5G System (SGS) for vertical and Local Area Network (LAN) services (Release 16)",Jun. 10, 2019, XP051756431, total 117 pages.

* cited by examiner

| A terminal device receives first clock source information, where the first clock source information is clock source information of a wireless communication system | S1001 |

| The terminal device sends the first clock source information to an adjacent device | S1002 |

COMMUNICATION METHOD, APPARATUS, AND SYSTEM

CROSS-REFERENCE TO RELATED APPLICATIONS

The present application is a continuation of International Patent Application No. PCT/CN2020/121650, filed on Oct. 16, 2020, which claims priority to Chinese Patent Application No. 202010092659.X, filed on Feb. 14, 2020, the disclosures of the aforementioned applications are hereby incorporated by reference in their entireties.

TECHNICAL FIELD

This application relates to the field of communication technologies, and in particular, to a communication method, apparatus, and system.

BACKGROUND

A clock synchronization scheme is defined based on a black-box architecture in 3rd Generation Partnership Project (3GPP) Release (R) 16. As shown in FIG. 1, a clock synchronization scheme defined in R16 is used for an adjacent device (for example, a switching node 1/a data terminal 1 in FIG. 1) that is of a device-side time sensitive network (TSN) translator (DS-TT) and that is in a TSN to synchronize to a TSN clock from another device (for example, an adjacent device (for example, a switching node 2/a data terminal 2 in FIG. 1) that is of a network-side TSN translator (NW-TT) and that is in the TSN) in the TSN. Specifically, a fifth generation (5G) system is virtualized as a switching node in the TSN, and a time aware relay mechanism defined in 802.1AS is used to implement clock synchronization of a device on the left of the DS-TT. Network elements in the 5G system are clock-synchronized, and a synchronized clock is referred to as a 5G clock. A user plane function (UPF) network element, the NW-TT, and a new radio node (gNB) synchronize to the 5G clock by using 1588, 802.1AS, or another manner (where a specific method is not limited in a standard). A terminal device synchronizes to the 5G clock from the gNB by using an air interface mechanism. After receiving a clock synchronization packet from the adjacent device in the TSN, the NW-TT adds a timestamp to the clock synchronization packet based on the 5G clock, where the timestamp is time information of receiving the clock synchronization packet by the NW-TT. Then, the clock synchronization packet is sent to the DS-TT by using a protocol data unit (PDU) session of the terminal device, and the DS-TT determines, based on the timestamp in the clock synchronization packet and time information of sending the clock synchronization packet by the DS-TT to the adjacent device in the TSN, a delay of transmitting the clock synchronization packet from the NW-TT to the DS-TT, adds the delay to correction information in the clock synchronization packet, and then sends a modified clock synchronization packet to the adjacent device in the TSN. In this way, the adjacent device in the TSN implements TSN clock synchronization based on a definition in 802.1AS. Particularly, if there is no clock source in an external network (that is, only the 5G system in a network has a clock source), the UPF network element may provide the clock source for the external network based on a configuration and the like, that is, the external network synchronizes to a 5G clock source. In this case, the NW-TT serves as a clock source, and according to a definition of a function of the clock source, the NW-TT can issue a clock source announcement to an adjacent device in the external network, and send the clock synchronization packet. Alternatively, the DS-TT may serve as a clock source, and according to a definition of a function of the clock source, the DS-TT can issue a clock source announcement to an adjacent device of the external network, and send the clock synchronization packet.

In 3GPP R17, a 5G system clock, as a capability of a 5G network, may be opened to an external network, to release a clock to the external network and provide a clock synchronization function according to a requirement of the external network. However, a method for the DS-TT to obtain clock source information is not provided in 3GPP R16. If the DS-TT generates the clock source information, the clock source information may be different from clock source information released by an NW-TT side. Consequently, 5G system clock source information obtained by an adjacent device of the NW-TT in the external network is different from that obtained by an adjacent device of the DS-TT in the external network, and devices at both sides may consider that clock sources obtained by the devices are not the same.

Therefore, when the 5G system clock is used as the clock source, how to determine the clock source information of the 5G system is an urgent problem to be resolved currently.

SUMMARY

One or more embodiments of this application provide a communication method, apparatus, and system, to resolve a problem that clock source information of a 5G system cannot be determined when a 5G system clock is used as a clock source.

To achieve the foregoing objective, the following technical solutions are used in one or more embodiments of this application.

According to a first aspect, a communication method is provided. The method includes: A terminal device receives first clock source information, where the first clock source information is clock source information of a wireless communication system; and the terminal device sends the first clock source information to an adjacent device. Based on the communication method provided in this embodiment of this application, because the terminal device may obtain clock source information of the wireless communication system, and clock source information obtained by a user plane network element is also clock source information of the wireless communication system, the terminal device and the user plane network element may obtain the same clock source information. Therefore, when a clock of the wireless communication system (for example, a 5G system) is used as a clock source, the adjacent device of the terminal device and an adjacent device of the user plane network element may consider that the wireless communication system provides a same clock source for the outside.

With reference to the first aspect, in some embodiments, that a terminal device receives first clock source information includes: The terminal device receives a first clock source announcement from a user plane network element, where the first clock source announcement includes the first clock source information. In other words, in this embodiment of this application, the terminal device may obtain the first clock source information from the user plane network element.

With reference to the first aspect, in some embodiments, that the terminal device sends the first clock source information to an adjacent device includes: The terminal device sends the first clock source announcement to the adjacent device. In other words, in this embodiment of this application, the user plane network element may generate the first clock source announcement, and the terminal device directly forwards the first clock source announcement.

With reference to the first aspect, in some embodiments, the method further includes: When the terminal device determines that the first clock source information is the clock source information of the wireless communication system, the terminal device generates a second clock source announcement based on the first clock source information, where the second clock source announcement includes the first clock source information; and the terminal device sends the second clock source announcement to the adjacent device. In other words, in this solution, the clock source announcement sent by the terminal device to the adjacent device may be initially generated by the user plane network element, and subsequently generated by the terminal device. Based on this solution, because the user plane network element does not need to periodically send the first clock source announcement to the terminal device subsequently, load of the user plane network element can be reduced.

With reference to the first aspect, in some embodiments, that the terminal device sends the first clock source information to an adjacent device includes: When the terminal device determines that the first clock source information is the clock source information of the wireless communication system, the terminal device generates a third clock source announcement based on the first clock source information, where the third clock source announcement includes the first clock source information; and the terminal device sends the third clock source announcement to the adjacent device. In other words, in this solution, the clock source announcement sent by the terminal device to the adjacent device is generated by the terminal device. Based on this solution, because the user plane network element does not need to periodically send the first clock source announcement to the terminal device subsequently, load of the user plane network element can be reduced.

With reference to the first aspect, in some embodiments, the method further includes: The terminal device stores the first clock source information or the first clock source announcement. In this way, it may be convenient for the terminal device to directly send a generated clock source announcement to the adjacent device subsequently after the terminal device generates the clock source announcement.

With reference to the first aspect, in some embodiments, the method further includes: When the terminal device determines that the first clock source information is the clock source information of the wireless communication system, and a clock source corresponding to the first clock source information is an optimal clock source, the terminal device generates a clock synchronization packet, and sends the clock synchronization packet to the adjacent device. In other words, in this embodiment of this application, the terminal device may generate the clock synchronization packet to be sent to the adjacent device, and the user plane network element does not need to periodically generate the clock synchronization packet and then send the clock synchronization packet to the terminal device. Therefore, load of the user plane network element can be reduced.

With reference to the first aspect, in some embodiments, the first clock source announcement includes indication information, and the indication information indicates that the first clock source information is the clock source information of the wireless communication system; and the method further includes: The terminal device determines, based on the indication information, that the first clock source information is the clock source information of the wireless communication system.

With reference to the first aspect, in some embodiments, the method further includes: The terminal device determines, based on prestored characteristic information of the clock source information of the wireless communication system, that the first clock source information is the clock source information of the wireless communication system.

With reference to the first aspect, in some embodiments, the method further includes: The terminal device receives a clock synchronization packet from the user plane network element, where the clock synchronization packet includes a first timestamp, and the first timestamp represents a moment at which the user plane network element sends the clock synchronization packet; the terminal device determines a forwarding delay of the clock synchronization packet in the wireless communication system based on the first timestamp and a moment at which the terminal device forwards the clock synchronization packet; and after adding the forwarding delay to a correction field in the clock synchronization packet, the terminal device sends the clock synchronization packet to the adjacent device at the moment at which the terminal device forwards the clock synchronization packet; or the terminal device sends the clock synchronization packet to the adjacent device at the moment at which the terminal device forwards the clock synchronization packet, where the first timestamp in the clock synchronization packet is updated to a second timestamp, and the second timestamp is determined based on the forwarding delay. Based on this solution, the terminal device may obtain the clock synchronization packet, and send the clock synchronization packet to the outside, so that clock synchronization of an external network is implemented.

With reference to the first aspect, in some embodiments, the method further includes: The terminal device receives a fourth clock source announcement from the adjacent device, where the fourth clock source announcement includes fourth clock source information, and the fourth clock source information is clock source information outside the wireless communication system; and the terminal device sends the fourth clock source announcement to the user plane network element. In other words, in this embodiment of this application, after receiving the fourth clock source announcement from an external network, the terminal device needs to send the fourth clock source announcement to the user plane network element, and the user plane network element selects an optimal clock source.

With reference to the first aspect, in some embodiments, the method further includes: The terminal device receives a fifth clock source announcement from the adjacent device, where the fifth clock source announcement includes fifth clock source information, and the fifth clock source information is clock source information outside the wireless communication system; and when a clock source corresponding to the fifth clock source information is better than the clock source corresponding to the first clock source information, the terminal device sends the fifth clock source announcement to the user plane network element. In other words, in this embodiment of this application, after receiving the fifth clock source announcement from an external network, the terminal device may send the fifth clock source announcement to the user plane network element when the clock source corresponding to the fifth clock source information is better than the clock source corresponding to the first clock source information, so that the user plane network element learns of a current optimal clock source.

With reference to the first aspect, in some embodiments, that a terminal device receives first clock source information includes: The terminal device receives the first clock source information from a control plane network element. In other words, in this embodiment of this application, the terminal device may obtain the first clock source information from the control plane network element.

With reference to the first aspect, in some embodiments, that the terminal device sends the first clock source information to an adjacent device includes: The terminal device generates a sixth clock source announcement based on the first clock source information, where the sixth clock source announcement includes the first clock source information; and the terminal device sends the sixth clock source announcement to the adjacent device. In other words, in this embodiment of this application, after generating the sixth clock source announcement, the terminal device may directly send the sixth clock source announcement to the adjacent device. Because the user plane network element does not need to periodically generate the clock source announcement and then send the clock source announcement to the terminal device, load of the user plane network element can be reduced.

With reference to the first aspect, in some embodiments, the method further includes: When a clock source corresponding to the first clock source information is an optimal clock source, the terminal device generates a clock synchronization packet, and sends the clock synchronization packet to the adjacent device. In other words, in this embodiment of this application, after generating the clock synchronization packet, the terminal device may directly send the clock synchronization packet to the adjacent device. Because the user plane network element does not need to periodically generate the clock synchronization packet and then send the clock synchronization packet to the terminal device, load of the user plane network element can be reduced.

According to a second aspect, a communication method is provided. The method includes: A user plane network element obtains first clock source information, where the first clock source information is clock source information of a wireless communication system; the user plane network element generates a first clock source announcement based on the first clock source information, where the first clock source announcement includes the first clock source information; and the user plane network element sends the first clock source announcement to a terminal device. Based on the communication method provided in this embodiment of this application, because the user plane network element sends the first clock source announcement to the terminal device, the terminal device can obtain the clock source information of the wireless communication system. The clock source information obtained by the user plane network element is also the clock source information of the wireless communication system. Therefore, the terminal device and the user plane network element may obtain the same clock source information, so that when a clock of the wireless communication system (for example, a 5G system) is used as a clock source, an adjacent device of the terminal device and an adjacent device of the user plane network element may consider that the wireless communication system provides a same clock source for the outside.

With reference to the second aspect, in some embodiments, that a user plane network element obtains first clock source information includes: The user plane network element receives the first clock source information from an application function network element. In other words, in this embodiment of this application, the first clock source information may be opened to the application function network element, so that a third party may learn of clock information of the wireless communication system, and the third party may flexibly use various clock sources based on deployment and application requirements. In other words, in this embodiment of this application, a clock of the wireless communication system may be opened to an external network, so that the clock can be released to the external network and a clock synchronization function can be provided based on a requirement of the external network.

With reference to the second aspect, in some embodiments, the method further includes: When the user plane network element determines that a clock source corresponding to the first clock source information is an optimal clock source, the user plane network element generates a clock synchronization packet, and sends the clock synchronization packet to the terminal device.

With reference to the second aspect, in some embodiments, the first clock source announcement includes indication information, and the indication information indicates that the first clock source information is the clock source information of the wireless communication system. Based on the indication information, the terminal device may learn that the first clock source information is the clock source information of the wireless communication system.

With reference to the second aspect, in some embodiments, the method further includes: The user plane network element receives a fourth clock source announcement from the terminal device, where the fourth clock source announcement is sent by an adjacent device of the terminal device to the terminal device and then forwarded by the terminal device to the user plane network element, the fourth clock source announcement includes fourth clock source information, and the fourth clock source information is clock source information outside the wireless communication system. In other words, in this embodiment of this application, after receiving the fourth clock source announcement from an external network, the terminal device needs to send the fourth clock source announcement to the user plane network element, and the user plane network element selects an optimal clock source.

With reference to the second aspect, in some embodiments, the method further includes: The user plane network element receives a fifth clock source announcement from the terminal device, where the fifth clock source announcement is sent by an adjacent device of the terminal device to the terminal device, and then forwarded by the terminal device to the user plane network element when a clock source corresponding to the fifth clock source information is better than a clock source corresponding to the first clock source information, the fifth clock source announcement includes fifth clock source information, and the fifth clock source information is clock source information outside the wireless communication system. In other words, in this embodiment of this application, after receiving the fifth clock source announcement from an external network, the terminal device may send the fifth clock source announcement to the user plane network element when the clock source corresponding to the fifth clock source information is better than the clock source corresponding to the first clock source information, so that the user plane network element learns of a current optimal clock source.

With reference to the second aspect, in some embodiments, the method further includes: The user plane network element sends sixth clock source information, where the sixth clock source information is a part or all of the first clock source information. The control plane network element or the application function network element may determine the first clock source information or a part of information in the first clock source information based on the sixth clock source information.

With reference to the second aspect, in some embodiments, the sixth clock source information includes at least one of clock precision information, a clock source identifier, a clock source priority of the wireless communication system, or information that is of the wireless communication system and that is about a domain that can be served when the wireless communication system is opened to the outside.

With reference to the second aspect, in some embodiments, the first clock source information includes clock precision information, a clock source identifier, a clock source priority of the wireless communication system, and information that is of the wireless communication system and that is about the domain that can be served when the wireless communication system is opened to the outside.

According to a third aspect, a communication method is provided. The method includes: A user plane network element receives first clock source information from an application function network element, where the first clock source information is clock source information of a wireless communication system; the user plane network element generates a seventh clock source announcement based on the first clock source information, where the seventh clock source announcement includes the first clock source information; and the user plane network element sends the seventh clock source announcement to an adjacent device. In other words, in this embodiment of this application, the first clock source information may be opened to the application function network element, so that a third party may learn of clock information of the wireless communication system, and the third party may flexibly use various clock sources based on deployment and application requirements. In other words, in this embodiment of this application, a clock of the wireless communication system may be opened to an external network, so that the clock can be released to the external network and a clock synchronization function can be provided based on a requirement of the external network.

With reference to the third aspect, in some embodiments, the method further includes: When the user plane network element determines that a clock source corresponding to the first clock source information is an optimal clock source, the user plane network element generates a clock synchronization packet, and sends the clock synchronization packet to a terminal device.

With reference to the third aspect, in some embodiments, the method further includes: The user plane network element receives a fourth clock source announcement from the terminal device, where the fourth clock source announcement is sent by an adjacent device of the terminal device to the terminal device and then forwarded by the terminal device to the user plane network element, the fourth clock source announcement includes fourth clock source information, and the fourth clock source information is clock source information outside the wireless communication system. In other words, in this embodiment of this application, after receiving the fourth clock source announcement from an external network, the terminal device needs to send the fourth clock source announcement to the user plane network element, and the user plane network element selects an optimal clock source.

With reference to the third aspect, in some embodiments, the method further includes: The user plane network element receives a fifth clock source announcement from the terminal device, where the fifth clock source announcement is sent by an adjacent device of the terminal device to the terminal device, and then forwarded by the terminal device to the user plane network element when a clock source corresponding to the fifth clock source information is better than a clock source corresponding to the first clock source information, the fifth clock source announcement includes fifth clock source information, and the fifth clock source information is clock source information outside the wireless communication system. In other words, in this embodiment of this application, after receiving the fifth clock source announcement from an external network, the terminal device may send the fifth clock source announcement to the user plane network element when the clock source corresponding to the fifth clock source information is better than the clock source corresponding to the first clock source information, so that the user plane network element learns of a current optimal clock source.

With reference to the third aspect, in some embodiments, the method further includes: The user plane network element sends sixth clock source information, where the sixth clock source information is a part or all of the first clock source information. The control plane network element or the application function network element may determine the first clock source information or a part of information in the first clock source information based on the sixth clock source information.

With reference to the third aspect, in some embodiments, the sixth clock source information includes at least one of clock precision information, a clock source identifier, a clock source priority of the wireless communication system, or information that is of the wireless communication system and that is about a domain that can be served when the wireless communication system is opened to the outside.

With reference to the third aspect, in some embodiments, the first clock source information includes clock precision information, a clock source identifier, a clock source priority of the wireless communication system, and information that is of the wireless communication system and that is about a domain that can be served when the wireless communication system is opened to the outside.

According to a fourth aspect, a communication method is provided. The method includes: An application function network element receives seventh clock source information, where the seventh clock source information is a part or all of first clock source information, and the first clock source information is clock source information of a wireless communication system; and the application function network element sends the first clock source information to a user plane network element or a control plane network element. In other words, in this embodiment of this application, the first clock source information may be opened to the application function network element, so that a third party may learn of clock information of the wireless communication system, and the third party may flexibly use various clock sources based on deployment and application requirements. In other words, in this embodiment of this application, a clock of the wireless communication system may be opened to an external network, so that the clock can be released to the external network and a clock synchronization function can be provided based on a requirement of the external network.

With reference to the fourth aspect, in some embodiments, the method further includes: When the seventh clock source information is a part of information in the first clock source information, the application function network element determines the first clock source information.

With reference to the fourth aspect, in some embodiments, that the application function network element determines the first clock source information includes:

the application function network element determines the first clock source information based on one or more of the seventh clock source information, local configuration information, other clock source information, or application requirement information, where the other clock source information is clock source information outside the wireless communication system.

With reference to the fourth aspect, in some embodiments, the seventh clock source information includes at least one of clock precision information, a clock source identifier, a clock source priority of the wireless communication system, or information that is of the wireless communication system and that is about a domain that can be served when the wireless communication system is opened to the outside.

With reference to the fourth aspect, in some embodiments, the first clock source information includes clock precision information, a clock source identifier, a clock source priority of the wireless communication system, and information that is of the wireless communication system and that is about a domain that can be served when the wireless communication system is opened to the outside.

According to a fifth aspect, a communication method is provided. The method includes: A control plane network element receives first clock source information from an application function network element, where the first clock source information is clock source information of a wireless communication system; and the control plane network element sends the first clock source information to a terminal device and/or a user plane network element. In other words, in this embodiment of this application, the first clock source information may be opened to the application function network element, so that a third party may learn of clock information of the wireless communication system, and the third party may flexibly use various clock sources based on deployment and application requirements. In other words, in this embodiment of this application, a clock of the wireless communication system may be opened to an external network, so that the clock can be released to the external network and a clock synchronization function can be provided based on a requirement of the external network.

With reference to the fifth aspect, in some embodiments, the method further includes: The control plane network element sends seventh clock source information to the application function network element, where the seventh clock source information is a part or all of the first clock source information. Based on this solution, the application function network element may determine the first clock source information based on the seventh clock source information.

With reference to the fifth aspect, in some embodiments, the method further includes: The control plane network element receives sixth clock source information from the user plane network element, where the sixth clock source information is a part or all of the seventh clock source information. The control plane network element may determine the seventh clock source information based on the sixth clock source information.

With reference to the fifth aspect, in some embodiments, the method further includes: The control plane network element determines the seventh clock source information according to a local policy or a default rule.

According to a sixth aspect, a communication apparatus is provided, to implement the foregoing methods. The communication apparatus may be the terminal device in the first aspect, or an apparatus including the terminal device; or the communication apparatus may be the user plane network element in the second aspect or the third aspect, or an apparatus including the user plane network element; or the communication apparatus may be the application function network element in the fourth aspect, or an apparatus including the application function network element; or the communication apparatus may be the control plane network element in the fifth aspect, or an apparatus including the control plane network element. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a seventh aspect, a communication apparatus is provided. The communication apparatus includes a processor and a memory. The memory is configured to store computer instructions, and when the processor executes the instructions, the communication apparatus is enabled to perform the method according to any one of the foregoing aspects. The communication apparatus may be the terminal device in the first aspect, or an apparatus including the terminal device; or the communication apparatus may be the user plane network element in the second aspect or the third aspect, or an apparatus including the user plane network element; or the communication apparatus may be the application function network element in the fourth aspect, or an apparatus including the application function network element; or the communication apparatus may be the control plane network element in the fifth aspect, or an apparatus including the control plane network element.

According to an eighth aspect, a communication apparatus is provided. The communication apparatus includes a processor. The processor is configured to: be coupled to a memory, and after reading instructions in the memory, perform the method according to any one of the foregoing aspects based on the instructions. The communication apparatus may be the terminal device in the first aspect, or an apparatus including the terminal device; or the communication apparatus may be the user plane network element in the second aspect or the third aspect, or an apparatus including the user plane network element; or the communication apparatus may be the application function network element in the fourth aspect, or an apparatus including the application function network element; or the communication apparatus may be the control plane network element in the fifth aspect, or an apparatus including the control plane network element.

According to a ninth aspect, a computer-readable storage medium is provided. The computer-readable storage medium stores instructions. When the instructions are run on a computer, the computer is enabled to perform the method according to any one of the foregoing aspects.

According to a tenth aspect, a computer program product including instructions is provided. When the computer program product runs on a computer, the computer is enabled to perform the method according to any one of the foregoing aspects.

According to an eleventh aspect, a communication apparatus (for example, the communication apparatus may be a chip or a chip system) is provided. The communication apparatus includes a processor, configured to implement a function in any one of the foregoing aspects. In a possible design, the communication apparatus further includes a memory, and the memory is configured to store necessary program instructions and data. When the communication apparatus is a chip system, the communication apparatus may include a chip, or may include a chip and another discrete component.

For technical effects brought by any design in the sixth aspect to the eleventh aspect, refer to technical effects brought by different designs in the first aspect, the second aspect, the third aspect, the fourth aspect, or the fifth aspect. Details are not described herein again.

According to a twelfth aspect, a communication system is provided. The communication system includes a terminal device and a user plane network element. The user plane network element is configured to send a first clock source announcement to the terminal device, where the first clock source announcement includes first clock source information, and the first clock source information is clock source information of a wireless communication system. The terminal device is configured to: receive the first clock source announcement from the user plane network element, and send the first clock source information to an adjacent device.

For technical effects brought by the twelfth aspect, refer to the technical effects brought by the first aspect or the second aspect. Details are not described herein again.

According to a thirteenth aspect, a communication system is provided. The communication system includes a terminal device and a control plane network element. The control plane network element is configured to send first clock source information to the terminal device, where the first clock source information is clock source information of a wireless communication system. The terminal device is configured to: receive the first clock source information from the control plane network element, and send the first clock source information to an adjacent device.

For technical effects brought by the thirteenth aspect, refer to the technical effects brought by the first aspect. Details are not described herein again.

According to a fourteenth aspect, a communication system is provided. The communication system includes an application function network element and a user plane network element. The application function network element is configured to send first clock source information to the user plane network element, where the first clock source information is clock source information of a wireless communication system. The user plane network element is configured to: receive the first clock source information from the application function network element, and generate a seventh clock source announcement based on the first clock source information, where the seventh clock source announcement includes the first clock source information. The user plane network element is further configured to send the seventh clock source announcement to an adjacent device.

For technical effects brought by the fourteenth aspect, refer to the technical effects brought by the third aspect. Details are not described herein again.

DESCRIPTION OF EMBODIMENTS

For ease of understanding of solutions in embodiments of this application, related technologies or concepts are first briefly described below.

1. TSN

A TSN generally includes a switching node (bridge) and a data terminal (end station). The data terminal and the switching node may form a network topology structure, and the switching node may forward a packet to the data terminal or another switching node according to a forwarding rule configured or created by the switching node.

Figure 1:
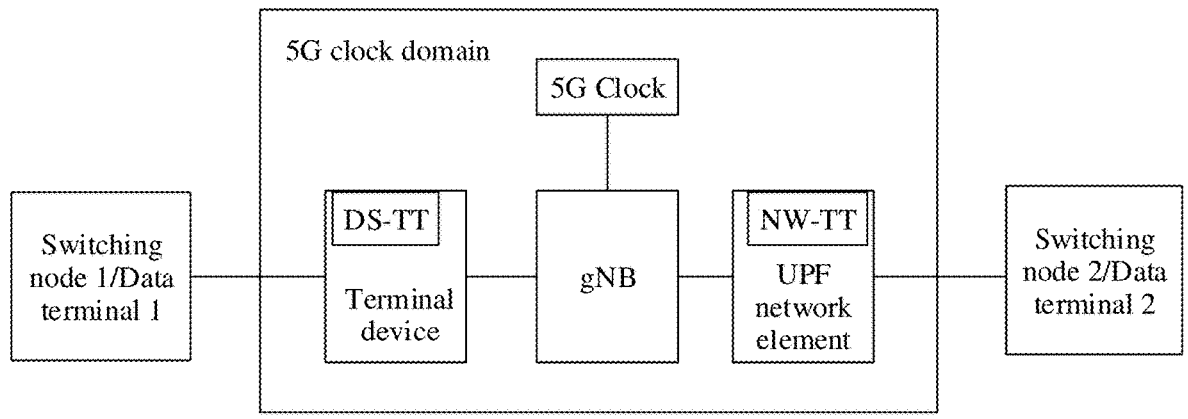
FIG. 1 is a schematic diagram of a clock synchronization scheme defined based on a black-box architecture in 3GPP R16.
Figure 2:
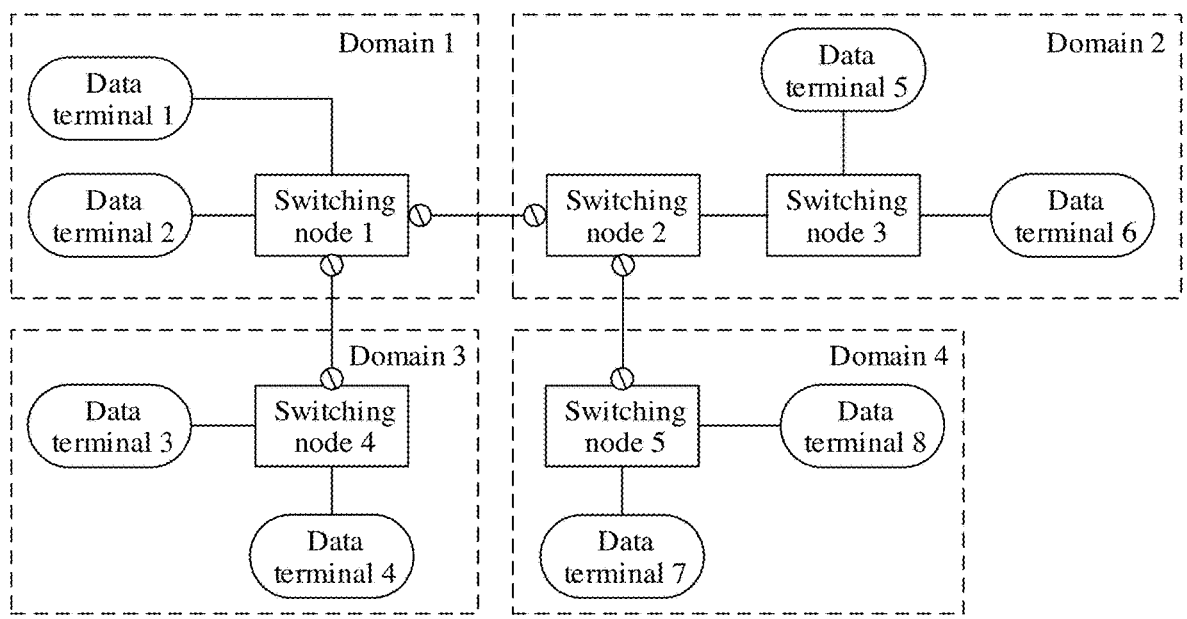
FIG. 2 is a schematic diagram of an existing TSN architecture.

There are a plurality of types of network topology structures formed by data terminals and switching nodes, and configuration may be performed based on an application scenario. FIG. 2 is a schematic diagram of a simple network topology structure of the TSN. The simple network topology structure includes a plurality of domains (where in FIG. 2, an example in which the plurality of domains include a domain 1, a domain 2, a domain 3, and a domain 4 is used for illustration), and each domain includes one or more data terminals and one or more switching nodes. Devices and ports in a same domain have a same domain identifier (for example, a traffic class).

The TSN is based on Layer 2 transmission. A TSN standard defines behaviors of the data terminal and the switching node, and a scheduling mode of a data stream forwarded by the switching node (where the data stream includes one or more packets, the data terminal and switching node forward the data stream, that is, transmit the one or more packets, and the packet may also become a packet in the data stream), to implement reliable delay transmission. The switching node in the TSN uses a destination media access control (MAC) address, an internet protocol (IP) address, or another packet feature of a packet as a stream feature of a data stream, and performs resource reservation and scheduling planning based on a delay requirement of the data stream, to ensure reliability and a transmission delay according to a generated scheduling policy.

Data terminals may be classified into a transmit end (talker) and a receive end (listener). A sender of a data stream is referred to as the transmit end (talker), and a receiver of the data stream is referred to as the receive end (listener). When the transmit end or the receive end sends a data stream requirement to the TSN, TSN configuration is enabled. The TSN configuration includes configuration of a switching node on a path from the transmit end to the receive end.

In some embodiments, the TSN may further include a configuration network element, for example, a centralized network configuration (CNC) network element or a centralized user configuration (CUC) network element, that is configured to implement the TSN configuration.

Figure 3:
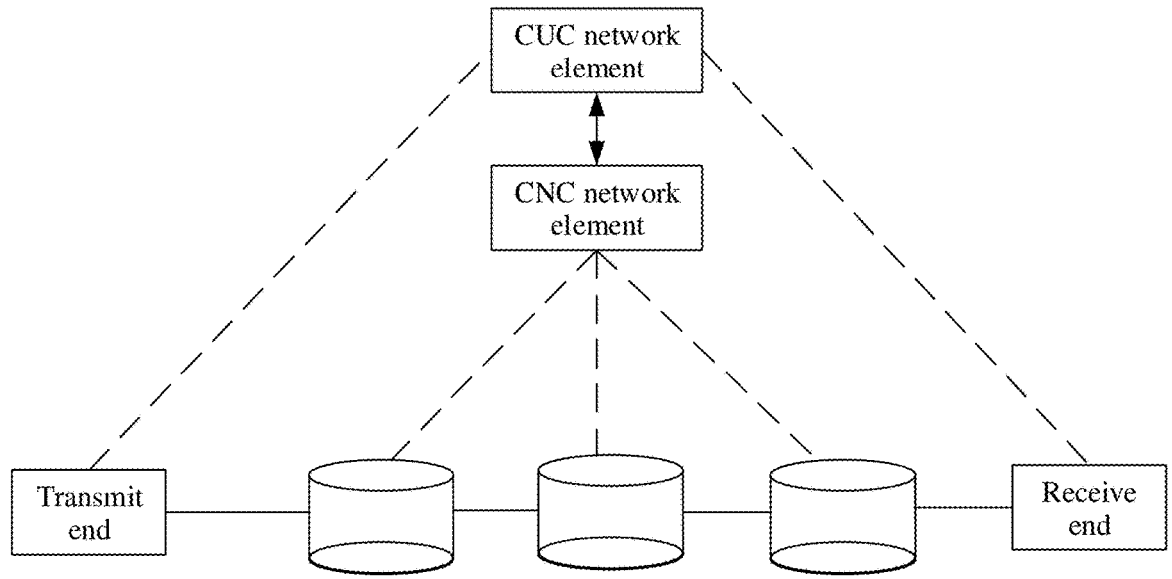
FIG. 3 is a schematic diagram of a centralized management architecture of an existing TSN.

FIG. 3 is a schematic diagram of a centralized management architecture of a TSN. The centralized management architecture is one of three architectures defined in 802.1qcc in a TSN standard. The centralized management architecture includes a transmit end, a receive end, a switching node, a CNC network element, and a CUC network element. It should be noted that a quantity of network elements and a network topology structure shown in FIG. 3 are merely examples. This is not specifically limited in embodiments of this application.

The switching node reserves a resource for a data stream according to a definition in the TSN standard, and schedules and forwards a data packet.

The CNC network element is responsible for managing a TSN user plane topology and information about the switching node, generating a transmission path of a data stream and a forwarding rule on a data terminal and each switching node based on a stream creation request provided by the CUC network element, and then delivering the forwarding rule (for example, information such as a stream feature of the data stream and identifiers of ingress and egress ports used during data transmission) and scheduling information (for example, information such as time information of the ingress port and information about a traffic class corresponding to the egress port) on the switching node to a corresponding switching node. For related descriptions of the time information of the ingress port and the information about the traffic class corresponding to the egress port, refer to a current technology. Details are not described herein again.

The information about the switching node includes port information (for example, information about the ingress and egress ports used during data transmission) and delay information (for example, an internal transmission delay of the switching node) of the switching node. The information about the switching node may be reported by the switching node to the CNC network element in advance.

In embodiments of this application, a wireless communication system (for example, a 5G system) may be used as a virtual switching node, and information about the virtual switching node also includes port information and delay information of the virtual switching node.

Specifically, ports of the virtual switching node are classified into an ingress port and an egress port for transmitting uplink and downlink data. The ingress port of the virtual switching node includes a port on a terminal device side and a port on a user plane network element side, for example, a port on the terminal device side for receiving the uplink data and a port on the user plane network element side for receiving the downlink data. The egress port of the virtual switching node includes a port on the terminal device side and a port on the user plane network element side, for example, a port on the terminal device side for sending the downlink data and a port on the user plane network element side for sending the uplink data.

The CUC network element is configured to obtain a TSN capability of a data terminal, that is, obtain a quantity of ports of the data terminal, a MAC address of each port, and an 802.1 capability supported by each port. On this basis, the CUC network element may collect a stream creation request of the data terminal. After performing matching on a stream creation request of a transmit end and a stream creation request of a receive end, the CUC network element may request the CNC network element to create a data stream, and confirm the forwarding rule generated by the CNC network element. The performing matching on a stream creation request of a transmit end and a stream creation request of a receive end means the following: The transmit end and the receive end each send a stream creation request to the CUC network element, where the stream creation request includes some information, for example, a destination MAC address of a requested data stream. The CUC network element performs matching on the stream creation request and a destination MAC address of a data stream requested by a different data terminal. If destination MAC addresses of data streams requested by two data terminals are the same, the data streams requested by the two data terminals are the same, the matching succeeds, and the data stream can be created. Otherwise, only the stream creation request of the transmit end or the receive end is available, and the data stream cannot be created.

It may be understood that the CNC network element and the CUC network element are control plane network elements in the TSN.

In addition to a function of forwarding data or a packet, the switching node in the TSN further needs to have another function. For example, the switching node has a topology discovery function, determines a switch identifier and a switch port identifier, and supports a protocol such as a link layer discovery protocol (LLDP). For another example, the switching node may determine a transmission delay, and after detecting an internal transmission delay of the switching node, reports the detected transmission delay to the configuration network element. This is not specifically limited in embodiments of this application.

2. Clock Synchronization and Optimal Clock Source Selection

Based on clock synchronization, the data terminal and the switching node in the TSN can implement end-to-end transmission with a determined delay. A clock synchronization mechanism is defined in existing protocols 1588 and 802.1AS, and can implement high-precision clock synchronization between a network device and a clock source. 1588 supports a plurality of clock domains, that is, the network device can synchronize a plurality of clocks, and different clock domains are distinguished by clock domain identifiers. 802.1AS supports selection of an optimal clock source from the same TSN for synchronization. A master clock source releases clock source information of the master clock source, and a secondary node compares received master clock source information to determine the optimal clock source.

Figure 4:
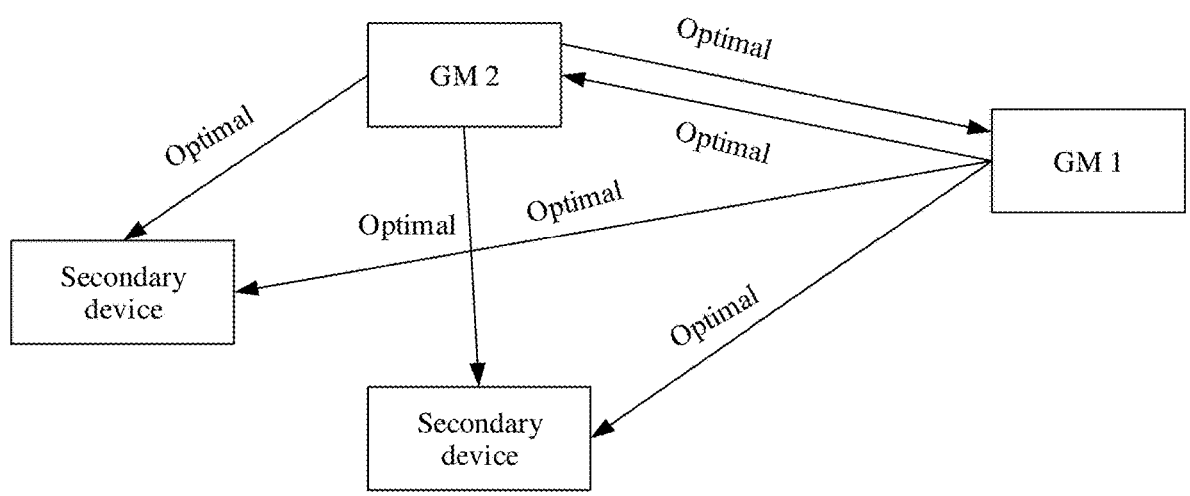
FIG. 4 is a schematic diagram of existing optimal clock source selection.

As shown in FIG. 4, before determining that a master clock/master clock source (GM) 1 is the optimal clock source, a secondary device determines that a GM 2 is the optimal clock source, and then the GM 1 determines that the GM 1 is better than the GM 2 and releases a clock source announcement, which includes parameters such as a clock source priority (for example, a grandmaster priority 1 or a grandmaster priority 2), clock precision information (grandmaster clock quality), and a clock source identifier (grandmaster identity). The secondary device determines that the GM 1 is the optimal clock source based on the received clock source announcement. After determining the optimal clock source, the secondary device forwards optimal clock source information to a downstream device and performs clock synchronization.

The clock source information included in the clock source announcement in embodiments of this application includes but is not limited to the foregoing clock source priority, clock precision information, and clock source identifier. A combination of the clock source priority, the clock precision information, and the clock source identifier is referred to as a system identity. If information about the system identity is combined into one value, a smaller value of the system identity indicates a better clock source. Considering that bits of a field in which the clock source priority is located are higher than bits of a field in which the clock source precision is located, and the bits of the field in which the clock source precision is located are higher than bits of a field in which the clock source identifier is located, it may be concluded that: A smaller value of the clock source priority indicates a better clock source; when clock source priorities are the same, higher clock source precision indicates a better clock source; and it is similar for another field in the system identity.

The following describes the technical solutions in embodiments of this application with reference to the accompanying drawings in embodiments of this application. In descriptions of this application, "/" represents an "or" relationship between associated objects unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one (piece) of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference. In addition, in embodiments of this application, the word such as "example" or "for example" represents giving an example, an illustration, or descriptions. Any embodiment or design scheme described as an "example" or with "for example" in embodiments of this application should not be explained as being more preferred or having more advantages than another embodiment or design scheme. Exactly, use of the word such as "example" or "for example" is intended to present a relative concept in a specific manner for ease of understanding.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to similar technical problems.

Figure 5:
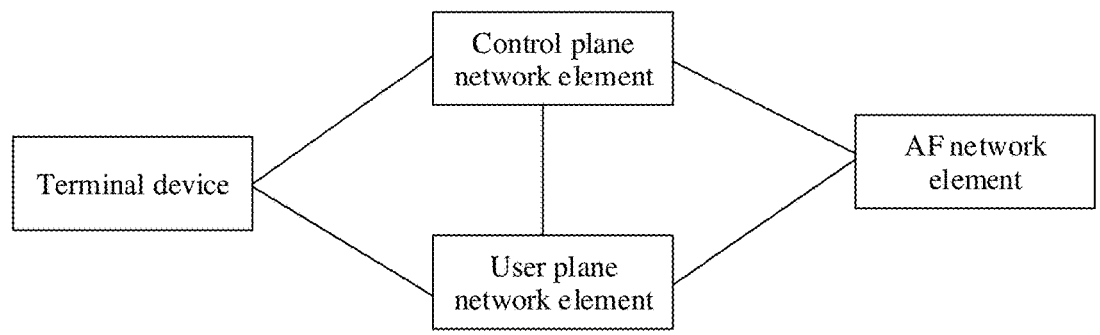
FIG. 5 is a schematic diagram of an architecture of a communication system according to an embodiment of this application.

FIG. 5 shows a communication system 50 according to an embodiment of this application. The communication system 50 includes a terminal device, a user plane network element, a control plane network element, and an application function (AF) network element. The terminal device may communicate with the control plane network element and the user plane network element, the user plane network element may communicate with the control plane network element, and the control plane network element and the user plane network element may further communicate with the AF network element. "Communication" in this embodiment of this application may be direct communication, or may be communication performed through forwarding by another device. This is not specifically limited in this embodiment of this application. The following separately describes the foregoing network elements.

In some embodiments, the terminal device may be a device configured to implement a wireless communication function, for example, a terminal or a chip that may be used in the terminal. The terminal device may be deployed on land, where the deployment includes indoor or outdoor, or handheld or vehicle-mounted deployment, may be deployed on water (for example, on a ship), or may be deployed in air (for example, on an aircraft, a balloon, and a satellite). The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The terminal may be mobile or fixed.

In some embodiments, the user plane network element is mainly responsible for processing a user packet (for example, a clock source announcement or a clock synchronization packet in this embodiment of this application), for example, forwarding, charging, or performing lawful interception. The user plane network element may also be referred to as a protocol data unit (PDU) session anchor (PSA). In a 5G communication system, the user plane network element may be a UPF network element. In a future communication system such as a 6th generation (6G) communication, the user plane network element may still be the UPF network element or have another name. This is not limited in this embodiment of this application.

In some embodiments, the control plane network element may include, for example, a mobility management network element, a policy control network element, a session management network element, or a network exposure function network element.

In some embodiments, the mobility management network element is used for attachment, mobility management, and a tracking area update process of a terminal device in a mobile network. The mobility management network element terminates a non-access stratum (NAS) message, performs registration management, connection management and reachability management, allocates a tracking area list (TA list), performs mobility management and the like, and transparently routes a session management (SM) message to the session management network element. In the 5G communication system, the mobility management network element may be an access and mobility management function (AMF) network element. In the future communication system such as the 6G communication system, the mobility management network element may still be the AMF network element or have another name. This is not limited in this embodiment of this application.

In some embodiments, the session management network element is used for session management, for example, session establishment, modification, and release, in a mobile network. A specific function is, for example, allocating an internet protocol (IP) address to a user, or selecting a user plane network element that provides a packet forwarding function. In the 5G communication system, the session management network element may be a session management function (SMF) network element. In the future communication system such as the 6G system, the session management network element may still be the SMF network element or have another name. This is not limited in this embodiment of this application.

In some embodiments, the policy control network element includes a user subscription data management function, a policy control function, a charging policy control function, quality of service (QoS) control, and the like, is configured to: guide a unified policy framework of network behavior, provide policy rule information for a control plane function network element (for example, the AMF network element), and the like. In the 5G communication system, the policy control network element may be a policy control function (PCF) network element. In the future communication system such as the 6G communication system, the policy control network element may still be the PCF network element or have another name. This is not limited in this embodiment of this application.

In some embodiments, the network exposure function network element is configured to: provide a framework, authentication, and an interface related to network capability exposure, and transfer information between a network function in a wireless communication system and another network function. In the 5G communication system, the network exposure function network element may be a network exposure function (NEF) network element. In the future communication system such as the 6G communication system, the network exposure function network element may still be the NEF network element or have another name. This is not limited in this embodiment of this application.

In some embodiments, the AF network element is a function network element that can provide various services, and may be an application control platform of a third party, or may be a device of an operator. The AF network element may provide services for a plurality of application servers, can interact with a core network directly or by using the network exposure function network element, and can interact with a policy management framework for policy management.

Figure 6:
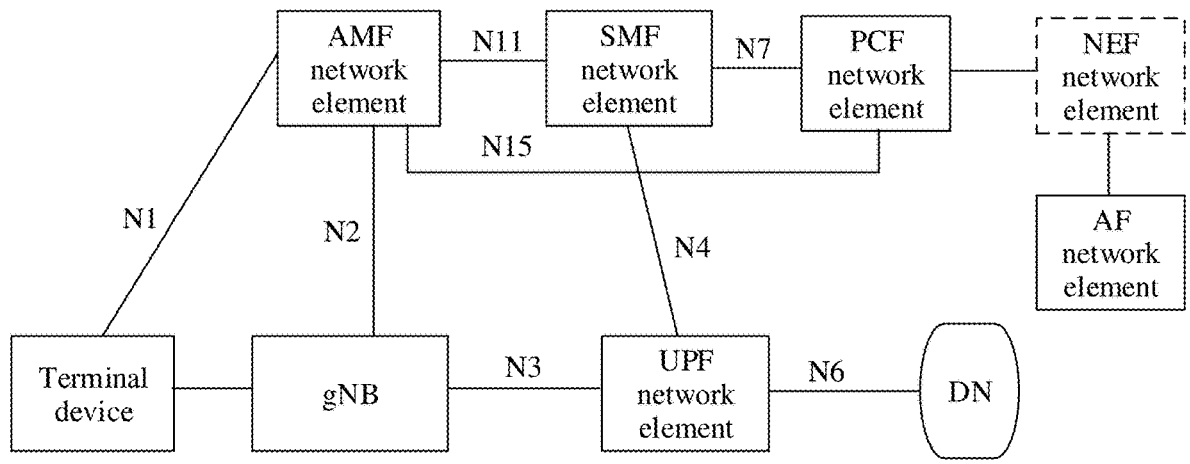
FIG. 6 is a schematic diagram of a possible network architecture that corresponds to the communication system shown in FIG. 5 and that is applicable to at least an embodiment of this application.

The 5G system is used as an example. FIG. 6 is a schematic diagram of a network architecture that corresponds to the communication system shown in FIG. 5 and that is applicable to an embodiment of this application. A network element or an entity corresponding to the mobility management network element may be an AMF network element in the 5G communication system. A network element or an entity corresponding to the session management network element may be an SMF network element in the 5G communication system. A network element or an entity corresponding to the user plane network element may be a UPF network element in the 5G communication system. A network element or an entity corresponding to the policy control network element may be a PCF network element in the 5G communication system. A network element or an entity corresponding to the network exposure function network element may be an NEF network element in the 5G communication system. In addition, as shown in FIG. 5, the 5G system may further include a radio access network (RAN) device (where an example in which the RAN device is a gNB is used for illustration in FIG. 5) and a data network (DN). Although not shown, the 5G system may further include a unified data management (UDM) network element, a unified data repository (UDR) network element, or the like. This is not specifically limited in this embodiment of this application.

The terminal device communicates with the AMF network element by using a next generation (N) 1 interface (N1 for short). The gNB communicates with the AMF network element by using an N2 interface (N2 for short). The gNB communicates with the UPF network element by using an N3 interface (N3 for short). The UPF network element communicates with the DN by using an N6 interface (N6 for short). The AMF network element communicates with the SMF network element by using an N11 interface (N11 for short). The AMF network element communicates with the PCF network element by using an N15 interface (N15 for short). The SMF network element communicates with the PCF network element by using an N7 interface (N7 for short). The SMF network element communicates with the UPF network element by using an N4 interface (N4 for short). In some embodiments, the PCF network element communicates with the AF network element by using the NEF network element. Certainly, the AF network element may directly communicate with the PCF network element or the SMF network element. This is not specifically limited in this embodiment of this application.

Figure 7:
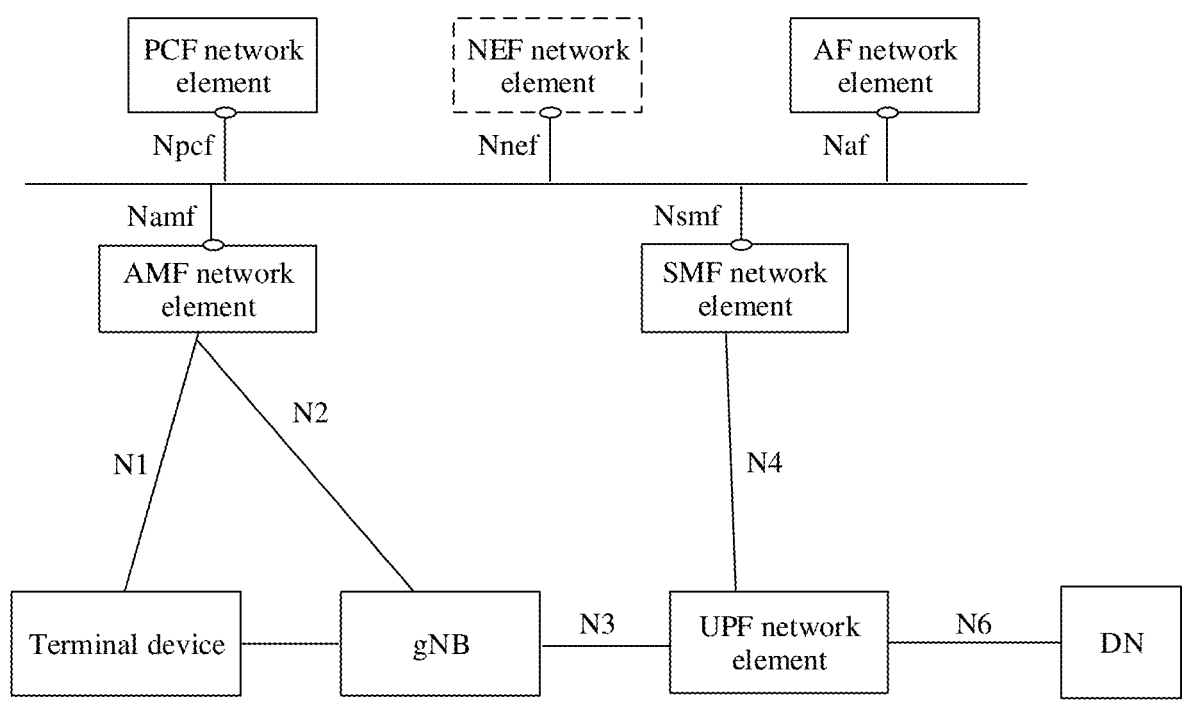
FIG. 7 is a schematic diagram of another possible network architecture that corresponds to the communication system shown in FIG. 5 and that is applicable to at least an embodiment of this application.

In addition, it should be noted that a control plane network element such as the AF network element, the AMF network element, the SMF network element, the PCF network element, or the NEF network element shown in FIG. 6 may also perform interaction by using a service-oriented interface. For example, as shown in FIG. 7, an external service-oriented interface provided by the AF network element may be a Naf; an external service-oriented interface provided by the AMF network element may be a Namf; an external service-oriented interface provided by the SMF network element may be an Nsmf; and an external service-oriented interface provided by the PCF network element may be the Npcf. For related descriptions, refer to a 5G system architecture in the standard 23501. Details are not described herein.

Figure 8:
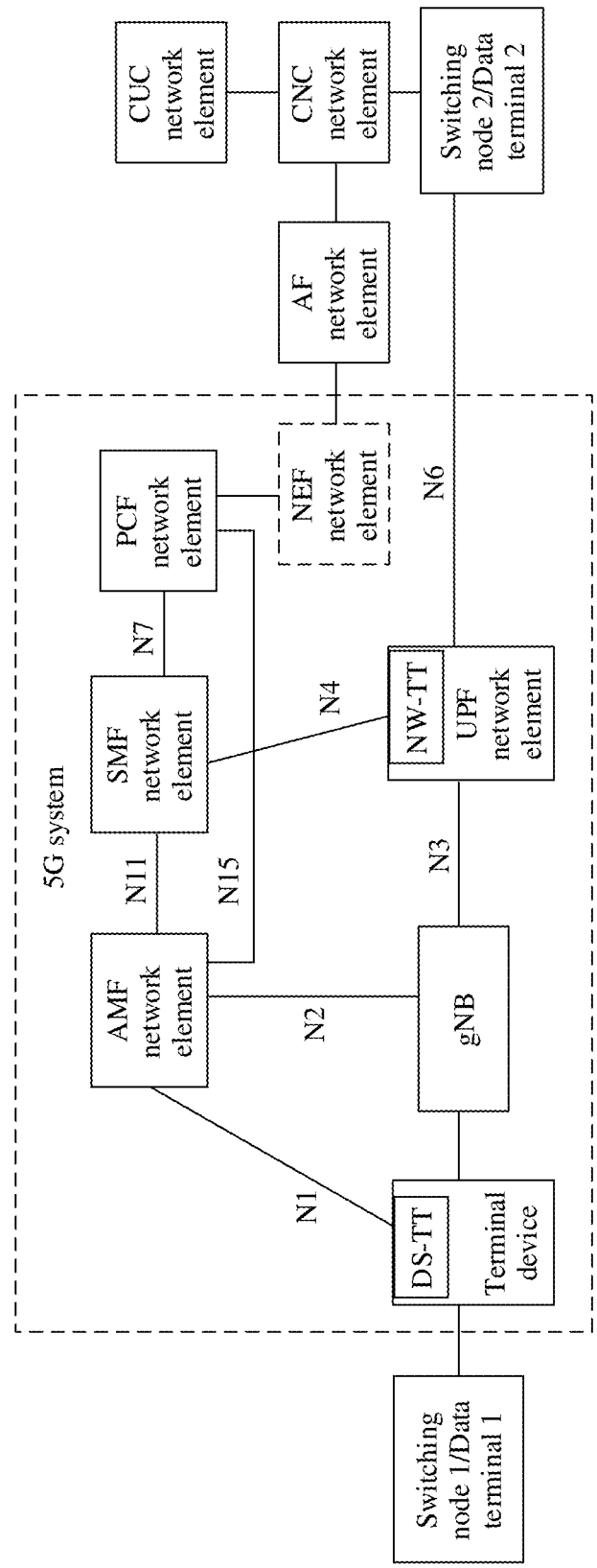
FIG. 8 is a schematic diagram of a network architecture in which a 5G system and a TSN are combined according to at least an embodiment of this application.

As described above, a wireless communication system may serve as a virtual switching node in a TSN. For example, the wireless communication system is the foregoing 5G system. FIG. 8 is a schematic diagram of a network architecture in which the 5G system and the TSN are combined. A TSN adaptation function, namely, an NW-TT, is added to a UPF network element side, and a TSN adaptation function, namely, a DS-TT, is added to a terminal device side. Both the NW-TT and the DS-TT are logical functions, and are used to implement functions, for example, clock synchronization and data forwarding, defined by the TSN when the 5G system is used as a switching node in the TSN. The TSN adaptation function means adapting a feature and information of the 5G system to information required by the TSN, and communicating with a network element (for example, a switching node 1/a data terminal 1 in FIG. 8, or a switching node 2/a data terminal 2 in FIG. 8) in the TSN by using a port/an interface defined by the TSN. This is uniformly described herein, and details are not described below again. In addition, as shown in FIG. 8, as a connection node between the 5G system and the TSN, an AF network element may interact with a CNC network element in the TSN, and provide information about a logical switching node for the CNC network element based on a requirement of a TSN switching node.

It should be noted that, in this embodiment of this application, the DS-TT may be deployed in the terminal device (that is, the DS-TT and the terminal device are jointly deployed), or the DS-TT and the terminal device may be separately and independently deployed. The NW-TT may be deployed in the UPF network element (that is, the NW-TT and the UPF network element are jointly deployed), or the NW-TT and the UPF network element may be separately and independently deployed. This is not specifically limited in this embodiment of this application. For ease of description, the following embodiments are all described by using an example in which the DS-TT is deployed in the terminal device and the NW-TT is deployed in the UPF network element. This is uniformly described herein, and details are not described below again. In addition, the DS-TT and the NW-TT are merely used to distinguish between the TSN adaptation functions added on the terminal device side and the UPF network element side. Certainly, the TSN adaptation functions added on the terminal device side and the UPF network element side may have other names. This is not specifically limited in embodiments of this application.

It should be noted that, in embodiments of this application, a port on the terminal device side included in the virtual switching node may be a physical port of the terminal device or a physical port of the DS-TT. The virtual switching node may include one or more physical ports on the terminal device side. The port on the terminal device side may be at a granularity of a terminal device. To be specific, one terminal device corresponds to one port, and different terminal devices correspond to different ports. Alternatively, the port on the terminal device side may be at a granularity of a PDU session. To be specific, one session corresponds to one port, and different sessions correspond to different ports. Alternatively, the port on the terminal device side may be at a granularity of a TSN. To be specific, one TSN domain corresponds to one or more ports, and one virtual port cannot correspond to different TSN domains.

It should be noted that, in embodiments of this application, a port on the UPF side included in the virtual switching node may be a physical port of the UPF network element or a physical port of the NW-TT. One UPF network element or NW-TT may include a plurality of physical ports. One physical port of the UPF network element or NW-TT corresponds to one virtual switching node. However, one virtual switching node may include a plurality of physical ports of one UPF or NW-TT, or may include a plurality of physical ports of a plurality of UPF network elements or NW-TTs.

In the network architecture in which the 5G system and the TSN are combined, a data stream is transmitted in a TSN network according to a definition of the TSN, and is transmitted by using a transmission mechanism of the 5G system when passing through a 5G user plane. In the 5G system, a data stream sent by the UPF network element to the terminal device is a downlink stream, and the downlink stream may be carried in a session of the terminal device. A data stream sent by the terminal device side to the UPF network element is an uplink stream.

It should be noted that FIG. 8 is merely an example of the schematic diagram of the network architecture in which the 5G system and the TSN is combined. In the following embodiments, a communication method in embodiments of this application is described mainly based on the schematic diagram of the network architecture shown in FIG. 8. However, actually, a combination of another communication system and the 5G system is not limited in embodiments of this application. When the another communication system and the 5G system are combined, there may be a problem of how to determine clock source information when a 5G system clock is used as a clock source. The communication method provided in embodiments of this application is also applicable to this. This is uniformly described herein, and details are not described below again.

In some embodiments, the terminal device, the control plane network element, the user plane network element, or the application function network element in embodiments of this application may also be referred to as a communication apparatus or a communication device, and each may be a general-purpose device or a dedicated device. This is not specifically limited in embodiments of this application.

In some embodiments, a related function of the terminal device, the control plane network element, the user plane network element, or the application function network element in embodiments of this application may be implemented by one device, may be jointly implemented by a plurality of devices, or may be implemented by one or more function modules in one device. This is not specifically limited in embodiments of this application. It may be understood that the foregoing function may be a network element in a hardware device, a software function running on dedicated hardware, a combination of hardware and software, or a virtualization function instantiated on a platform (for example, a cloud platform).

Figures 9, 10:
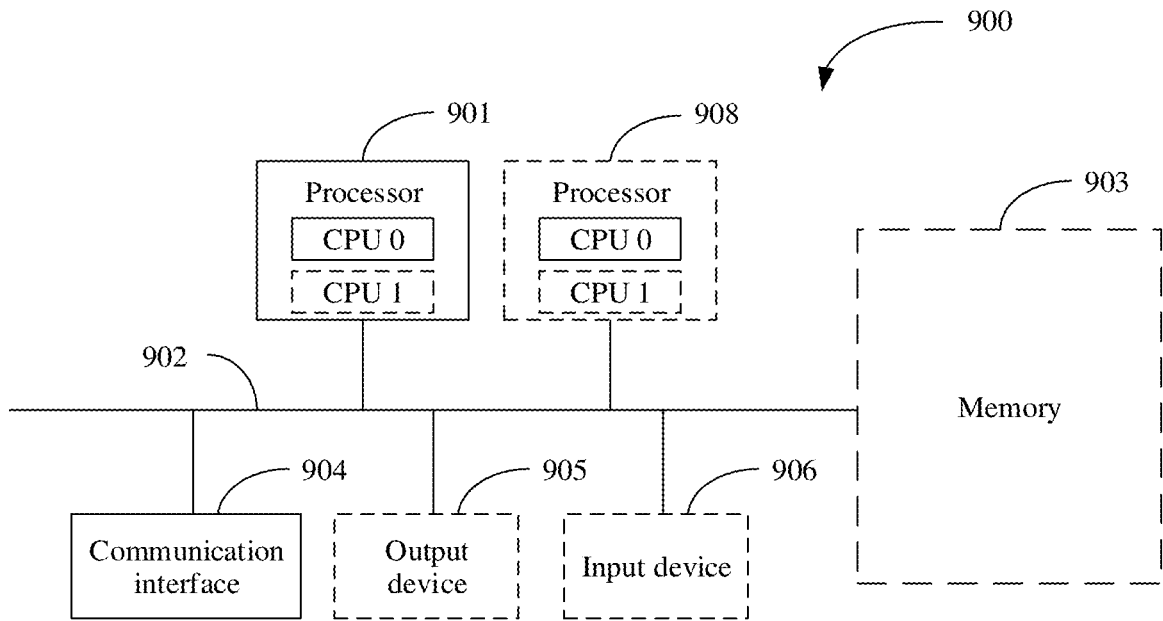
FIG. 9 is a schematic diagram of a structure of a communication device according to at least an embodiment of this application.
FIG. 10 is a schematic flowchart of a communication method according to at least an embodiment of this application.

For example, the related function the terminal device, the control plane network element, the user plane network element, or the application function network element in embodiments of this application may be implemented by using a communication device 900 in FIG. 9. FIG. 9 is a schematic diagram of a structure of the communication device 900 according to an embodiment of this application. The communication device 900 includes one or more processors 901, a communication line 902, and at least one communication interface (in FIG. 9, that the communication device 900 includes a communication interface 904 and one processor 901 is merely an example for description). In some embodiments, the communication device 900 may further include a memory 903.

The processor 901 may be a general-purpose central processing unit (CPU), a microprocessor, an application-specific integrated circuit (ASIC), or one or more integrated circuits configured to control program execution of the solutions in this application.

The communication line 902 may include a path used to connect different components.

The communication interface 904 may be a transceiver module configured to communicate with another device or a communication network such as the Ethernet, a RAN, or a wireless local area network (WLAN). For example, the transceiver module may be an apparatus such as a transceiver and a transceiver. In some embodiments, the communication interface 904 may alternatively be a transceiver circuit located inside the processor 901, and is configured to implement signal input and signal output of the processor.

The memory 903 may be an apparatus having a storage function. For example, the memory 903 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic storage medium or another magnetic storage device, or any other medium that can be used to carry or store expected program code in a form of instructions or a data structure and that can be accessed by a computer. However, this is not limited thereto. The memory may exist independently, and is connected to the processor by using the communication line 902. Alternatively, the memory may be integrated with the processor.

The memory 903 is configured to store computer-executable instructions for performing the solutions in this application, and the computer-executable instructions are executed under control of the processor 901. The processor 901 is configured to execute the computer-executable instructions stored in the memory 903, to implement the communication method provided in embodiments of this application.

In some embodiments, the processor 901 may perform processing-related functions in the communication methods provided in the following embodiments of this application. The communication interface 904 is responsible for communicating with another device or a communication network. This is not specifically limited in this embodiment of this application.

In some embodiments, the computer-executable instructions may also be referred to as application program code. This is not specifically limited in this embodiment of this application.

During specific implementation, in an embodiment, the processor 901 may include one or more CPUs, for example, a CPU 0 and a CPU 1 in FIG. 9.

During specific implementation, in an embodiment, the communication device 900 may include a plurality of processors, such as the processor 901 and the processor 908 in FIG. 9. Each of the processors may be a single-core processor or a multi-core processor. The processor herein may include but is not limited to at least one of the following various computing devices that run software: a CPU, a microprocessor, a digital signal processor (DSP), a microcontroller unit (MCU), an artificial intelligence processor, or the like. Each computing device may include one or more cores configured to perform an operation or processing by executing software instructions.

During specific implementation, in an embodiment, the communication device 900 may further include an output device 905 and an input device 906. The output device 905 communicates with the processor 901, and may display information in a plurality of manners. For example, the output device 905 may be a liquid crystal display (LCD), a light emitting diode (LED) display device, a cathode ray tube (CRT) display device, a projector, or the like. The input device 906 communicates with the processor 901, and may receive an input from a user in a plurality of manners. For example, the input device 906 may be a mouse, a keyboard, a touchscreen device, a sensor device, or the like.

The communication device 900 sometimes may also be referred to as a communication apparatus, and may be a general-purpose device or a dedicated device. For example, the communication device 900 may be a desktop computer, a portable computer, a network server, a palmtop computer (PDA), a mobile phone, a tablet computer, a wireless terminal device, an embedded device, the foregoing terminal device, the foregoing network device, or a device having a structure similar to the structure shown in FIG. 9. A type of the communication device 900 is not limited in this embodiment of this application.

FIG. 10 shows a communication method according to an embodiment of this application. The communication method includes the following steps.

S1001: A terminal device receives first clock source information, where the first clock source information is clock source information of a wireless communication system.

S1002: The terminal device sends the first clock source information to an adjacent device.

It should be noted that the "adjacent device of the terminal device" in this embodiment of this application refers to a device that is in an external network (that is, a network outside the wireless communication system) and that has a connection relationship with the terminal device. For example, in the network architecture in which the 5G system and the TSN are combined and that is shown in FIG. 8, the adjacent device of the terminal device is the switching node 1/the data terminal 1. Similarly, an "adjacent device of a user plane network element" in subsequent embodiments of this application refers to a device that is in an external network (that is, a network outside the wireless communication system) and that has a connection relationship with the user plane network element. For example, in the network architecture in which the 5G system and the TSN are combined and that is shown in FIG. 8, the adjacent device of the UPF network element is the switching node 2/the data terminal 2. This is uniformly described herein, and details are not described below again.

For the foregoing steps S1001 and S1002:

In some embodiments, that a terminal device receives first clock source information includes: The terminal device receives a first clock source announcement from a user plane network element, where the first clock source announcement includes the first clock source information. For this implementation, refer to the following descriptions of step S1105 in FIG. 11 or the following descriptions of step S1205 in FIG. 12. Details are not described herein again.

Further, in some embodiments, that the terminal device sends the first clock source information to an adjacent device includes: The terminal device sends the first clock source announcement to the adjacent device. For this implementation, refer to the following descriptions of step S1107 in FIG. 11 or the following descriptions of step S1207 in FIG. 12. Details are not described herein again.

Further, in some embodiments, the communication method may further include: When the terminal device determines that the first clock source information is the clock source information of the wireless communication system, the terminal device generates a second clock source announcement based on the first clock source information, and sends the second clock source announcement to the adjacent device, where the second clock source announcement includes the first clock source information. For this implementation, refer to the following descriptions of step S1207 in FIG. 12. Details are not described herein again.

Further, in some embodiments, that the terminal device sends the first clock source information to an adjacent device includes: When the terminal device determines that the first clock source information is the clock source information of the wireless communication system, the terminal device generates a third clock source announcement based on the first clock source information, and sends the third clock source announcement to the adjacent device, where the third clock source announcement includes the first clock source information. For this implementation, refer to the following descriptions of step S1207 in FIG. 12. Details are not described herein again.

Further, in some embodiments, the communication method may further include: When the terminal device determines that the first clock source information is the clock source information of the wireless communication system, and a clock source corresponding to the first clock source information is an optimal clock source, the terminal device generates a clock synchronization packet, and sends the clock synchronization packet to the adjacent device. For this implementation, refer to the following descriptions of step S1208 in FIG. 12. Details are not described herein again.

Further, in some embodiments, the first clock source announcement includes indication information, and the indication information indicates that the first clock source information is the clock source information of the wireless communication system; and the communication method provided in this embodiment of this application may further include: The terminal device determines, based on the indication information, that the first clock source information is the clock source information of the wireless communication system. For this implementation, refer to the following descriptions of step S1207 in FIG. 12. Details are not described herein again.

Further, in some embodiments, the communication method may further include: The terminal device determines, based on prestored characteristic information of the clock source information of the wireless communication system, that the first clock source information is the clock source information of the wireless communication system. For this implementation, refer to the following descriptions of step S1207 in FIG. 12. Details are not described herein again.

Further, in some embodiments, the communication method may further include: The terminal device receives a clock synchronization packet from the user plane network element, where the clock synchronization packet includes a first timestamp, and the first timestamp represents a moment at which the user plane network element sends the clock synchronization packet; the terminal device determines a forwarding delay of the clock synchronization packet in the wireless communication system based on the first timestamp and a moment at which the terminal device forwards the clock synchronization packet; and after adding the forwarding delay to a correction field in the clock synchronization packet, the terminal device sends the clock synchronization packet to the adjacent device at the moment at which the terminal device forwards the clock synchronization packet; or the terminal device sends the clock synchronization packet to the adjacent device at the moment at which the terminal device forwards the clock synchronization packet, where the first timestamp in the clock synchronization packet is updated to a second timestamp, and the second timestamp is determined based on the forwarding delay. For this implementation, refer to the following descriptions of steps S1108 to S1110 in FIG. 11. Details are not described herein again.

Further, in some embodiments, the communication method may further include: The terminal device receives a fourth clock source announcement from the adjacent device, where the fourth clock source announcement includes fourth clock source information, and the fourth clock source information is clock source information outside the wireless communication system; and the terminal device sends the fourth clock source announcement to the user plane network element. Alternatively, the communication method provided in this embodiment of this application may further include: The terminal device receives a fifth clock source announcement from the adjacent device, where the fifth clock source announcement includes fifth clock source information, and the fifth clock source information is clock source information outside the wireless communication system; and when a clock source corresponding to the fifth clock source information is better than the clock source corresponding to the first clock source information, the terminal device sends the fifth clock source announcement to the user plane network element. For this implementation, refer to the following descriptions of step S1107 in FIG. 11. Details are not described herein again.

For the foregoing steps S1101 and S1102:

In some embodiments, that a terminal device receives first clock source information includes: The terminal device receives the first clock source information from a control plane network element. For this implementation, refer to the following descriptions of step S1306 in FIG. 13. Details are not described herein again.

Further, in some embodiments, that the terminal device sends the first clock source information to an adjacent device includes: The terminal device generates a sixth clock source announcement based on the first clock source information, and sends the sixth clock source announcement to the adjacent device, where the sixth clock source announcement includes the first clock source information. For this implementation, refer to the following descriptions of step S1307 in FIG. 13. Details are not described herein again.

Further, in some embodiments, the communication method may further include: When a clock source corresponding to the first clock source information is an optimal clock source, the terminal device generates a clock synchronization packet, and sends the clock synchronization packet to the adjacent device. For this implementation, refer to the following descriptions of step S1308 in FIG. 13. Details are not described herein again.

Based on the communication method provided in this embodiment of this application, because the terminal device may obtain clock source information of the wireless communication system, and clock source information obtained by the user plane network element is also clock source information of the wireless communication system, the terminal device and the user plane network element may obtain the same clock source information. Therefore, when a clock of the wireless communication system is used as a clock source, the adjacent device of the terminal device and an adjacent device of the user plane network element may consider that the wireless communication system provides a same clock source for the outside.

The following describes the communication method provided in this embodiment of this application in detail with reference to FIG. 1 to FIG. 10.

It should be noted that this embodiment of this application is not limited to the network architecture in which the 5G system and the TSN are combined and that is shown in FIG. 8, and may be further applied to another future communication system, for example, a network architecture in which a 6G system and the TSN or another system are combined. In addition, in a future communication system, a function of each network element used in this embodiment of this application may remain unchanged, but a name of each network element may change.

It should be noted that names of messages between the network elements, names of parameters in the messages, or the like in the following embodiments of this application are merely examples, and there may be other names during specific implementation. This is not specifically limited in embodiments of this application.

Figure 11:
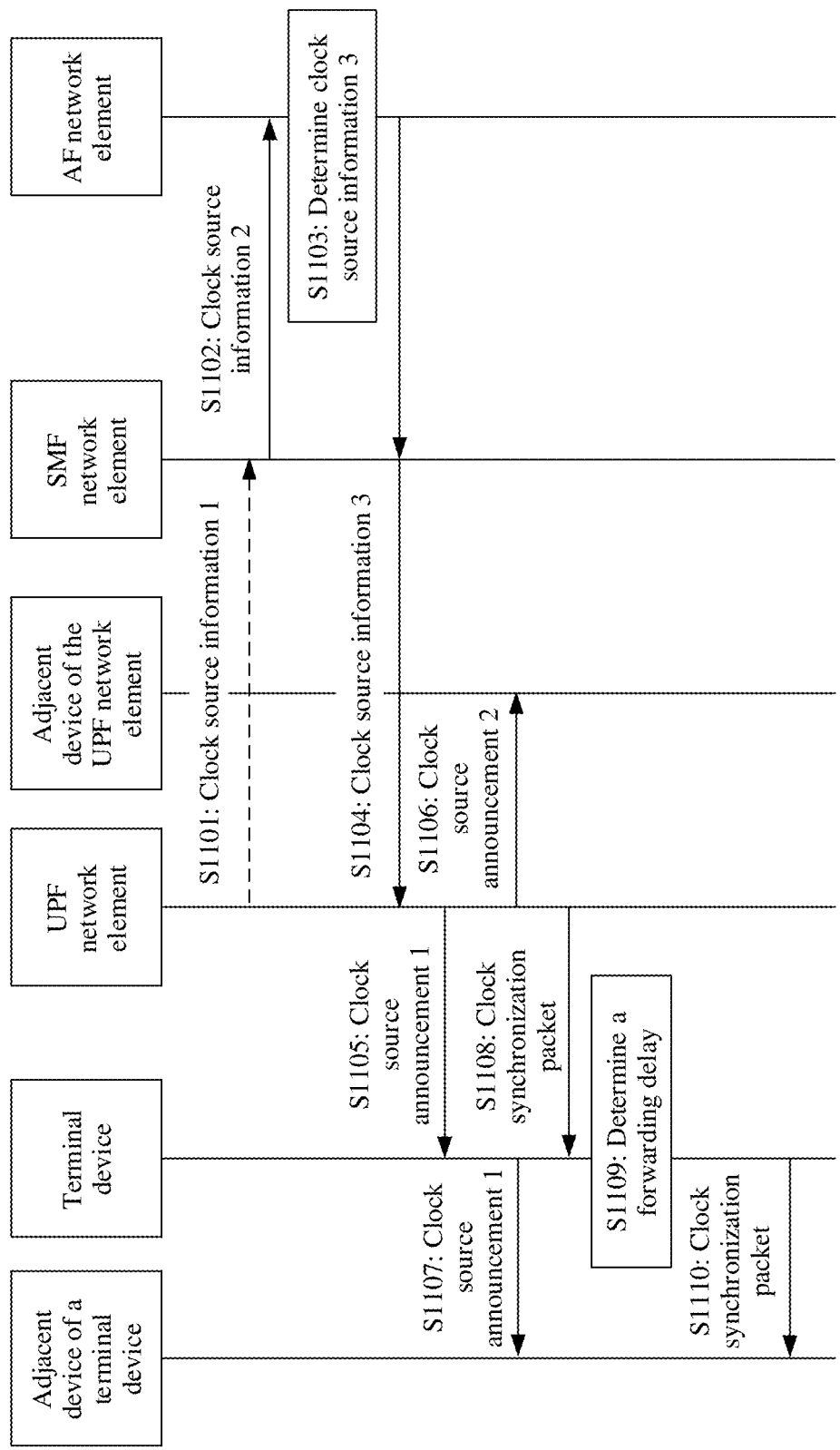
FIG. 11 is a schematic flowchart 1 of interaction in a communication method according to at least an embodiment of this application.

First, an example in which a wireless communication system is a 5G system is used. FIG. 11 shows a communication method according to an embodiment of this application. The communication method includes the following steps.

S1101: In some embodiments, a UPF network element sends clock source information 1 to an SMF network element. Correspondingly, the SMF network element receives the clock source information 1 from the UPF network element. The clock source information 1 is clock source information of the 5G system.

The clock source information 1 is a part or all of clock source information (namely, the following clock source information 3) included in a clock source announcement sent by the UPF network element to an adjacent device. That is, the clock source information 1 may be the same as the following clock source information 3, or the clock source information 1 may include a part of information in the following clock source information 3. This is uniformly described herein, and details are not described below again.

For example, the clock source information 1 includes at least one of clock precision information, a clock source identifier, or a clock source priority of the 5G system, or information that is of the 5G system and that is about a domain that can be served when the 5G system is opened to the outside. The clock precision information in this embodiment of this application is clock precision information defined in 802.1AS or 1588, and identifies precision of a 5G system clock. The clock source identifier is information created by the UPF network element to identify a clock, or is an identifier of a clock to which the UPF network element is synchronized in the 5G system. The clock source priority is used to identify a priority of a 5G system clock source relative to a clock source (for example, a TSN clock source) outside the 5G system. The domain information is used to identify the domain that can be served when the 5G system is opened to the outside. For example, the domain information may be information such as a data network name (DNN), single network slice selection assistance information (sS-NSSAI), or a clock domain identifier.

In some embodiments, the UPF network element may determine the clock source information 1 according to a local policy or a default rule. This is not specifically limited herein.

In some embodiments, the clock source information 1 may also be referred to as sixth clock source information. This is uniformly described herein, and details are not described below again.

In some embodiments, in a process of obtaining the clock source information 1, the SMF network element may also obtain indication information that indicates to use the 5G system clock as an external clock (in other words, use the 5G system clock externally). For example, when reporting the clock source information 1 to the SMF network element, the UPF network element indicates to use the 5G system clock as an external clock source. This is not specifically limited in this embodiment of this application.

In some embodiments, the information sent by the UPF network element may be reported to the SMF network element by using a container defined in 3GPP and through an N4 interface at a granularity of a device or an N4 interface corresponding to a user session, or may be reported to the SMF network element by using a new information element. This is not specifically limited in this embodiment of this application.

In some embodiments, in step S1101 the UPF network element may send the clock source information 1 in a user session establishment/modification process (where the UPF network element may choose to send the clock source information 1 in a user session procedure, and does not need to send the clock source information 1 in each session procedure); or the UPF network element may report the clock source information 1 after an AF network element sends a read instruction by using a container. This is not specifically limited in this embodiment of this application.

S1102: The SMF network element sends clock source information 2 to the AF network element. Correspondingly, the AF network element receives the clock source information 2 from the SMF network element. The clock source information 2 is clock source information of the 5G system.

The clock source information 2 is a part or all of clock source information (namely, the following clock source information 3) included in the clock source announcement sent by the UPF network element to the adjacent device. That is, the clock source information 2 may be the same as the following clock source information 3, or the clock source information 2 may include a part of information in the following clock source information 3. This is uniformly described herein, and details are not described below again.

For example, the clock source information 2 includes at least one of clock precision information, a clock source identifier, or a clock source priority of the 5G system, or information that is of the 5G system and that is about a domain that can be served when the 5G system is opened to the outside. For related descriptions of the clock precision information, the clock source identifier, or the clock source priority of the 5G system, or the information that is of the 5G system and that is about the domain that can be served when the 5G system is opened to the outside, refer to the foregoing step S1101. Details are not described herein again.

In some embodiments, if step S1101 is performed, the clock source information 2 may be the same as the clock source information 1; or the clock source information 2 includes the clock source information 1. The SMF network element may determine the clock source information 2 based on one or more of the clock source information 1, the local policy, or the default rule. This is not specifically limited in this embodiment of this application.

In another possible implementation, if the foregoing step S1101 is not performed, the SMF network element may determine the clock source information 2 according to the local policy or the default rule. This is not specifically limited in this embodiment of this application. For example, the SMF network element may determine the clock precision information based on clock synchronization precision of a gNB and clock synchronization precision between the gNB and the UPF network element. For example, lower precision of the two is determined as clock precision of the 5G system. This is not specifically limited in this embodiment of this application.

In some embodiments, the clock source information 2 may also be referred to as seventh clock source information. This is uniformly described herein, and details are not described below again.

In some embodiments, the SMF network element can send the clock source information 2 to the AF network element directly or by using an NEF network element. Alternatively, after the SMF network element sends the clock source information 2 to a PCF network element, the PCF network element may send the clock source information 2 to the AF network element directly or by using the NEF network element. This is not specifically limited in this embodiment of this application.

In some embodiments, the SMF network element may send the clock source information 2 in a user session establishment/modification process (where the SMF network element may choose to send the clock source information 2 in a user session procedure, and does not need to send the clock source information 2 in each session procedure); or the SMF network element may report the clock source information 2 after the AF network element sends a read instruction by using a container. This is not specifically limited in this embodiment of this application.

S1103: The AF network element determines the clock source information 3, where the clock source information 3 is clock source information of the 5G system.

For example, the clock source information 3 includes clock precision information, a clock source identifier, or a clock source priority of the 5G system, information that is of the 5G system and that is about a domain that can be served when the 5G system is opened to the outside, or the like. For related descriptions of the clock precision information, the clock source identifier, or the clock source priority of the 5G system, or the information that is of the 5G system and that is about the domain that can be served when the 5G system is opened to the outside, refer to the foregoing step S1101. Details are not described herein again.

In some embodiments, the AF network element may determine the clock source information 2 as the clock source information 3. In other words, the clock source information 2 and the clock source information 3 in this embodiment of this application are the same.

In another possible implementation, the AF network element may determine the clock source information 3 based on one or more of the clock source information 2, local configuration information, other clock source information, or application requirement information. The other clock source information herein is clock source information outside the 5G system, for example, other clock source information that is in a TSN and that is received from a CNC network element, or non-5G system clock source information received from another clock source. The local configuration information herein may be, for example, a local policy, a default rule, or non-5G system clock source information configured on the AF network element. This is not specifically limited in this embodiment of this application.

For example, the AF network element may determine, based on information about each clock source and an application requirement (where for example, it is considered that the 5G system clock is stable and reliable), the 5G system clock source as an optimal clock source, and configure a highest clock priority. Alternatively, the AF network element may determine, based on a locally configured correspondence between domain information (for example, a DNN or S-NSSAI) and a clock domain identifier, a clock domain identifier used when the 5G system clock is used as the clock source. Alternatively, the AF network element may allocate a clock source identifier as the clock source identifier used when the 5G system clock is used as the clock source.

In some embodiments, the clock source information 3 may also be referred to as first clock source information. This is uniformly described herein, and details are not described below again.

S1104: The AF network element sends the clock source information 3 to the UPF network element by using the SMF network element. Correspondingly, the UPF network element receives the clock source information 3 from the AF network element.

In some embodiments, the AF network element may send the clock source information 3 to the UPF network element when determining the 5G system clock as the external clock.

In some embodiments, the AF network element may encapsulate the clock source information 3 by using a clock source information interface defined in 802.1AS/1588, and then send the clock source information 3 to the UPF network element by using a container. For example, a sending path may be from the AF network element to the NEF network element (optional) to the PCF network element to the SMF network element to the UPF network element, or from the AF network element to the NEF network element (optional) to the SMF network element to the UPF network element. This is not specifically limited in this embodiment of this application.

In some embodiments, the AF network element may alternatively send the clock source information 3 to the SMF network element by using an information element, and the SMF network element configures the clock source information 3 for the UPF network element. This is not specifically limited in this embodiment of this application. For example, a path through which the AF network element sends the clock source information 3 to the SMF network element by using the information element may be from the AF network element to the NEF network element (optional) to the PCF network element to the SMF network element, or from the AF network element to the NEF network element (optional) to the SMF network element. This is not specifically limited in this embodiment of this application.

S1105: The UPF network element generates a clock source announcement 1 based on the clock source information 3, and sends the clock source announcement 1 to a terminal device. Correspondingly, the terminal device receives the clock source announcement 1 from the UPF network element. The clock source announcement 1 includes the clock source information 3.

In some embodiments, the clock source announcement 1 may also be referred to as a first clock source announcement. This is uniformly described herein, and details are not described below again.

S1106: The UPF network element generates a clock source announcement 2 based on the clock source information 3, and sends the clock source announcement 2 to an adjacent device of the UPF network element. Correspondingly, the adjacent device of the UPF network element receives the clock source announcement 2 from the UPF network element. The clock source announcement 2 includes the clock source information 3.

In some embodiments, the clock source announcement 1 and the clock source announcement 2 may be the same or may be different. This is not specifically limited in this embodiment of this application.

S1107: The terminal device sends the clock source announcement 1 to an adjacent device. Correspondingly, the adjacent device of the terminal device receives the clock source announcement 1 from the terminal device.

In some embodiments, if the terminal device receives a fourth clock source announcement of the adjacent device, the terminal device may send the fourth clock source announcement to the UPF network element. The fourth clock source announcement includes fourth clock source information, and the fourth clock source information is clock source information outside the 5G system. After receiving the fourth clock source announcement, if determining that a clock source corresponding to the fourth clock source information is better than the 5G system clock source, the UPF network element may send the fourth clock source announcement to the adjacent device of the UPF network element. This is not specifically limited in this embodiment of this application.

Alternatively, In some embodiments, if the terminal device receives a fifth clock source announcement from the adjacent device, the fifth clock source announcement includes fifth clock source information, and the fifth clock source information is clock source information outside the 5G system, the terminal device may send the fifth clock source announcement to the UPF network element when determining that a clock source corresponding to the fifth clock source information is better than the 5G system clock source. After receiving the fifth clock source announcement, the UPF network element may send the fifth clock source announcement to the adjacent device of the UPF network element. This is not specifically limited in this embodiment of this application.

S1108: When determining that the 5G system clock source is the optimal clock source, the UPF network element generates a clock synchronization packet, and sends the clock synchronization packet to the terminal device. Correspondingly, the terminal device receives the clock synchronization packet from the UPF network element.

In some embodiments, the clock synchronization packet may include a first timestamp, and the first timestamp represents a moment at which the UPF network element sends the clock synchronization packet.

S1109: The terminal device determines a forwarding delay of the clock synchronization packet in the 5G system based on the first timestamp and a moment at which the terminal device forwards the clock synchronization packet.

S1110: After adding the forwarding delay to a correction field in the clock synchronization packet, the terminal device sends the clock synchronization packet to the adjacent device of the terminal device at the moment at which the terminal device forwards the clock synchronization packet; or the terminal device sends the clock synchronization packet to the adjacent device of the terminal device at the moment at which the terminal device forwards the clock synchronization packet, where the first timestamp in the clock synchronization packet is updated to a second timestamp, and the second timestamp is determined based on the forwarding delay.

Correspondingly, the adjacent device of the terminal device receives the clock synchronization packet.

It should be noted that, in this embodiment of this application, the terminal device does not distinguish whether a received clock synchronization packet is a clock synchronization packet of the 5G system or a clock synchronization packet of a DN. This is uniformly described herein, and details are not described below again.

Based on the communication method provided in this embodiment of this application, because the terminal device may obtain clock source information of the 5G system from the UPF network element, in other words, the terminal device and the UPF network element may obtain the same 5G clock source information, when the 5G system is used as the clock source, the adjacent device of the terminal device and the adjacent device of the UPF network element may consider that the 5G system provides a same clock source for the outside. In addition, in this embodiment of this application, the 5G clock is opened, so that the clock source information of the 5G system is reported to the AF network element; and a third party may learn of the clock information of the 5G system, and the third party may flexibly use various clock sources based on deployment and application requirements. In other words, in this embodiment of this application, the 5G system clock may be opened to an external network, so that the clock can be released to the external network and a clock synchronization function can be provided based on a requirement of the external network.

The actions of the terminal device, the UPF network element, the AF network element, or the SMF network element in steps S1101 to S1110 may be performed by the processor 901 in the communication device 900 shown in FIG. 9 by invoking the application program code stored in the memory 903. This is not limited in this embodiment.

Figure 12:
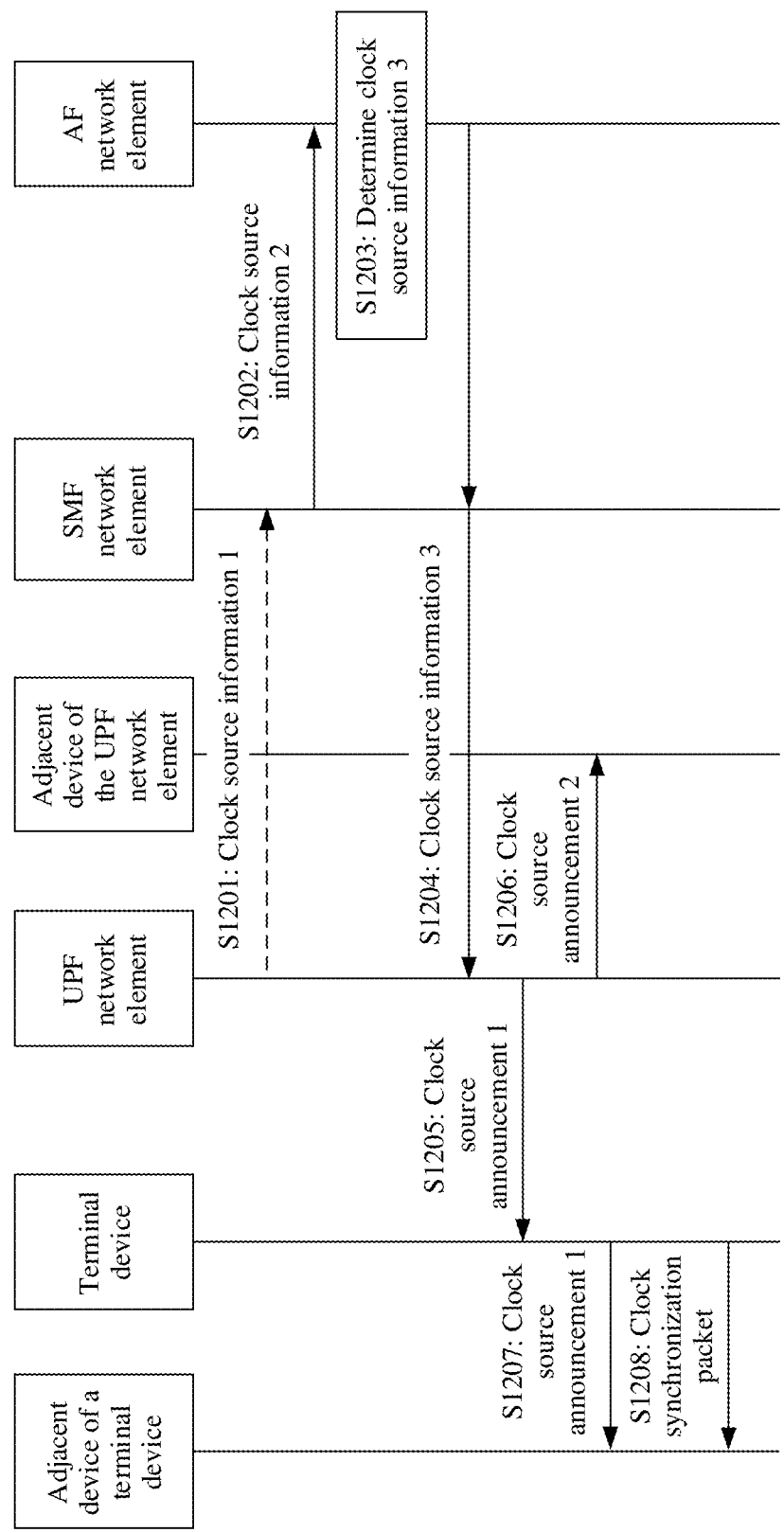
FIG. 12 is a schematic flowchart 2 of interaction in a communication method according to at least an embodiment of this application.

In some embodiments, an example in which a wireless communication system is a 5G system is used. FIG. 12 shows another communication method according to an embodiment of this application. The communication system includes the following steps.

S1201 to S1204: Steps S1201 to S1204 are the same as steps S1101 to S1104 in the embodiment shown in FIG. 11. For related descriptions, refer to the embodiment shown in FIG. 11. Details are not described herein again.

S1205: The UPF network element generates a clock source announcement 1 based on the clock source information 3, and sends the clock source announcement 1 to a terminal device. Correspondingly, the terminal device receives the clock source announcement 1 from the UPF network element. The clock source announcement 1 includes the clock source information 3.

In some embodiments, the clock source announcement 1 may further include indication information, and the indication information indicates that the clock source information 3 is clock source information of the 5G system. In some embodiments, a vendor-defined field defined in 1588/802.1 AS may be added to the clock source announcement 1, and the indication information may be added to the vendor-defined field. This is not specifically limited in this embodiment of this application.

In some embodiments, the clock source announcement 1 may also be referred to as a first clock source announcement. This is uniformly described herein, and details are not described below again.

S1206: The UPF network element generates a clock source announcement 2 based on the clock source information 3, and sends the clock source announcement 2 to an adjacent device of the UPF network element. Correspondingly, the adjacent device of the UPF network element receives the clock source announcement 2 from the UPF network element. The clock source announcement 2 includes the clock source information 3.

In some embodiments, the clock source announcement 1 and the clock source announcement 2 may be the same or may be different. This is not specifically limited in this embodiment of this application.

S1207: The terminal device sends the clock source announcement 1 to an adjacent device of the terminal device. Correspondingly, the adjacent device of the terminal device receives the clock source announcement 1 from the terminal device.

In some embodiments, after the terminal device sends the clock source announcement 1 to the adjacent device of the terminal device, the communication method provided in this embodiment of this application may further include: When determining that the clock source information 3 in the clock source announcement 1 is the clock source information of the 5G system, the terminal device stores the clock source information 3 or the clock source announcement 1. In this way, when the terminal device periodically sends a clock source announcement to the adjacent device subsequently, the terminal device may not need to receive the clock source announcement 1 sent by the UPF network element, but generates a second clock source announcement based on the clock source information 3, and sends the second clock source announcement to the adjacent device of the terminal device. The second clock source announcement includes the clock source information 3. In other words, in this solution, the clock source announcement sent by the terminal device to the adjacent device may be initially generated by the UPF network element, and subsequently generated by the terminal device. Based on this solution, because the UPF network element does not need to periodically send the clock source announcement 1 to the terminal device subsequently, load of the UPF network element can be reduced.

In some embodiments, step S1207 may not be performed. Instead, after the terminal device receives the clock source announcement 1, if the terminal device determines that the clock source information 3 in the clock source announcement 1 is the clock source information of the 5G system, the terminal device generates a third clock source announcement based on the clock source information 3, and sends the third clock source announcement to the adjacent device of the terminal device. The third clock source announcement includes the clock source information 3. This is not specifically limited in this embodiment of this application. Certainly, the terminal device may further store the clock source information 3 or the clock source announcement 1. When the terminal device periodically sends a clock source announcement to the adjacent device subsequently, the terminal device still generates the third clock source announcement based on the clock source information 3, and sends the third clock source announcement to the adjacent device of the terminal device. In other words, in this solution, the clock source announcement sent by the terminal device to the adjacent device is generated by the terminal device. Based on this solution, because the UPF network element does not need to periodically send the clock source announcement 1 to the terminal device subsequently, load of the UPF network element can be reduced.

In some embodiments, the terminal device may determine, based on the indication information included in the clock source announcement 1, that the clock source information 3 in the clock source announcement 1 is the clock source information of the 5G system. Alternatively, the terminal device may determine, based on prestored characteristic information (for example, a clock source identifier) of the clock source information of the 5G system, that the clock source information 3 in the clock source announcement 1 is the clock source information of the 5G system. Alternatively, the UPF network element may send the clock source announcement 1 to the terminal device by using a user session, and the terminal device considers, by default, that the clock source information 3 in the clock source announcement 1 received from the user session is the clock source information of the 5G system. This is not specifically limited in this embodiment of this application.

In some embodiments, the characteristic information of the clock source information of the 5G system prestored in the terminal device may be, for example, the clock source information 3 configured by the SMF network element on the terminal device. For specific implementation, refer to the following embodiment shown in FIG. 13. Details are not described herein again.

S1208: When the terminal device determines that the clock source information 3 in the clock source announcement 1 is the clock source information of the 5G system, and a 5G system clock source is an optimal clock source, the terminal device generates a clock synchronization packet, and sends the clock synchronization packet to the adjacent device of the terminal device. Correspondingly, the adjacent device of the terminal device receives the clock synchronization packet.

In other words, in this embodiment of this application, the terminal device may generate the clock synchronization packet to be sent to the adjacent device, and the UPF network element does not need to periodically generate the clock synchronization packet and then send the clock synchronization packet to the terminal device. Therefore, load of the UPF network element can be reduced.

It should be noted that, in this embodiment of this application, that the terminal device determines that the clock source information 3 in the clock source announcement 1 is the clock source information of the 5G system, and that the 5G system clock source is the optimal clock source may also be understood as that the terminal device determines a 5G system clock source corresponding to the clock source information 3 as an external clock source. This is uniformly described herein, and details are not described below again.

Based on the communication method provided in this embodiment of this application, because the terminal device may obtain clock source information of the 5G system from the UPF network element, in other words, the terminal device and the UPF network element may obtain the same 5G clock source information, when the 5G system is used as the clock source, the adjacent device of the terminal device and the adjacent device of the UPF network element may consider that the 5G system provides a same clock source for the outside. In addition, in this embodiment of this application, the 5G clock is opened, so that the clock source information of the 5G system is reported to the AF network element; and a third party may learn of the clock information of the 5G system, and the third party may flexibly use various clock sources based on deployment and application requirements. In other words, in this embodiment of this application, the 5G system clock may be opened to an external network, so that the clock can be released to the external network and a clock synchronization function can be provided based on a requirement of the external network. In addition, because in this embodiment of this application, the terminal device may generate the clock source announcement or the clock synchronization packet to be sent to the adjacent device, and the UPF network element does not need to periodically generate the clock source announcement or the clock synchronization packet and then send the clock source announcement or the clock synchronization packet to the terminal device, load of the UPF network element can be reduced.

The actions of the terminal device, the UPF network element, the AF network element, or the SMF network element in steps S1201 to S1208 may be performed by the processor 901 in the communication device 900 shown in FIG. 9 by invoking the application program code stored in the memory 903. This is not limited in this embodiment.

Figure 13:
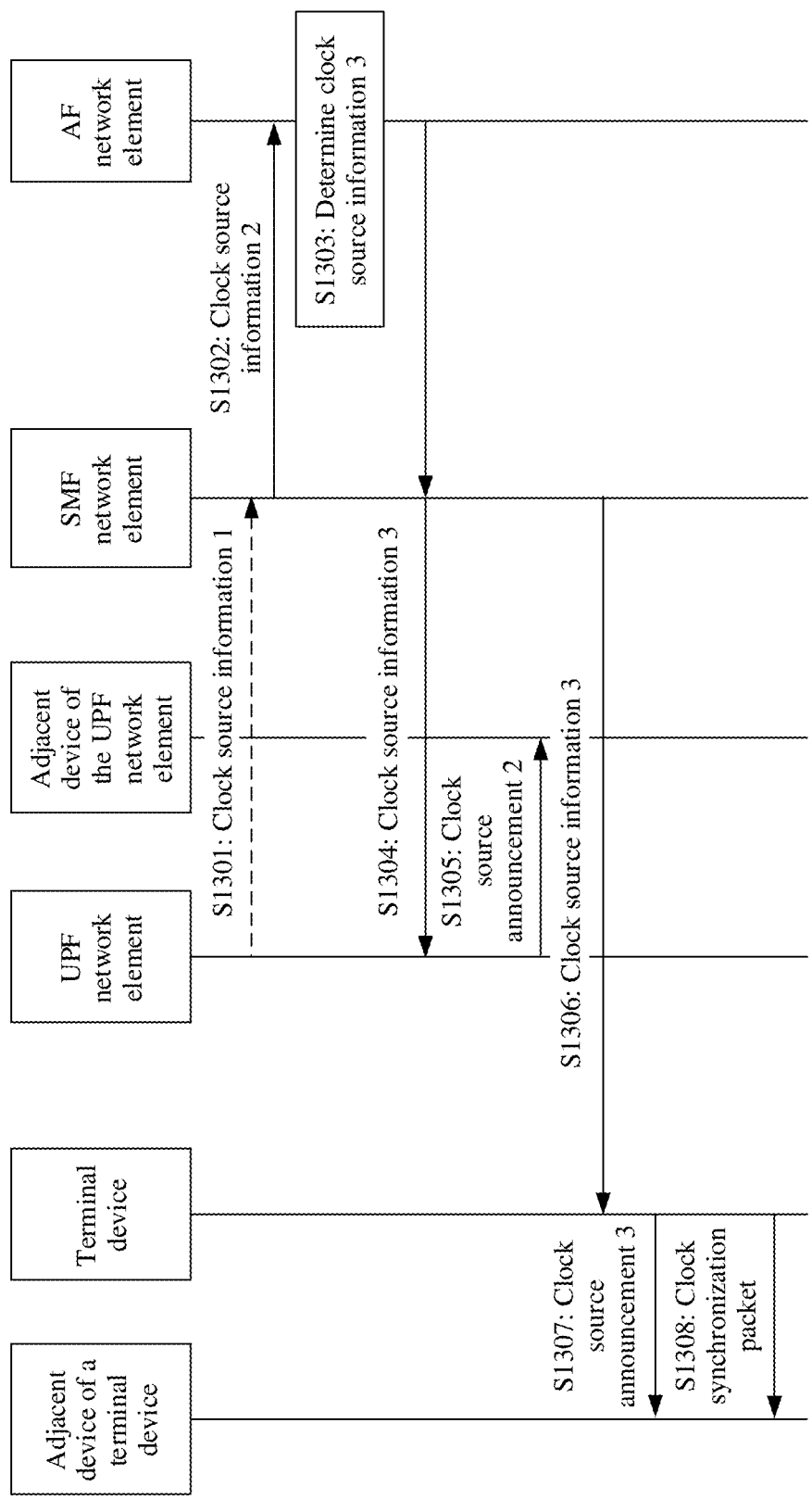
FIG. 13 is a schematic flowchart 3 of interaction in a communication method according to at least an embodiment of this application.

In some embodiments, an example in which a wireless communication system is a 5G system is used. FIG. 13 shows another communication method according to an embodiment of this application. The communication system includes the following steps.

S1301 to S1304: Steps S1301 to S1304 are the same as steps S1101 to S1104 in the embodiment shown in FIG. 11. For related descriptions, refer to the embodiment shown in FIG. 11. Details are not described herein again.

S1305: The UPF network element generates a clock source announcement 2 based on the clock source information 3, and sends the clock source announcement 2 to an adjacent device of the UPF network element. Correspondingly, the adjacent device of the UPF network element receives the clock source announcement 2 from the UPF network element. The clock source announcement 2 includes the clock source information 3.

S1306: The SMF network element sends the clock source information 3 to a terminal device. Correspondingly, the terminal device receives the clock source information 3 from the SMF network element.

In some embodiments, the SMF network element may send the clock source information 3 to the terminal device by using a container. For example, the AF network element encapsulates the clock source information 3 by using the container, and after the clock source information 3 is sent to the SMF network element, the SMF network element forwards the clock source information 3 to the terminal device. Alternatively, if the clock source information 3 is determined by the SMF network element or reported by the UPF network element to the SMF network element, the SMF network element may encapsulate the clock source information 3 by using the container after determining the clock source information 3 or after receiving the clock source information 3 from the UPF network element, and then send the clock source information 3 to the terminal device by using the container. This is not specifically limited in this embodiment of this application.

In some embodiments, the SMF network element may send the clock source information 3 to the terminal device by using a NAS information element.

In some embodiments, the clock source information 3 may be sent in a session establishment/modification message, or may be sent in a UE route selection policy (URSP) created by a PCF network element. This is not specifically limited in this embodiment of this application.

In some embodiments, in a scenario in which the SMF network element sends the clock source information 3 to the terminal device, the SMF network element may further send indication information to the terminal device, where the indication information indicates to use a 5G system clock source corresponding to the clock source information 3 as an external clock source, or the indication information indicates an external network to use the 5G system clock source corresponding to the clock source information 3. This is not specifically limited in this embodiment of this application.

S1307: The terminal device generates a clock source announcement 3, and sends the clock source announcement 3 to an adjacent device of the terminal device. Correspondingly, the adjacent device of the terminal device receives the clock source announcement 3 from the terminal device. The clock source announcement 3 includes the clock source information 3.

In some embodiments, the clock source announcement 3 and the clock source announcement 2 may be the same or may be different. This is not specifically limited in this embodiment of this application.

In other words, in this embodiment of this application, the terminal device may generate the clock source announcement to be sent to the adjacent device, and the UPF network element does not need to periodically generate the clock source announcement and then send the clock source announcement to the terminal device. Therefore, load of the UPF network element can be reduced.

In some embodiments, when the terminal device determines the 5G system clock source corresponding to the clock source information 3 as the external clock source, the terminal device may generate the clock source announcement 3, and send the clock source announcement 3 to the adjacent device of the terminal device. This is not specifically limited in this embodiment of this application.

In some embodiments, the terminal device may determine, based on the indication information sent by the SMF network element, the 5G system clock source corresponding to the clock source information 3 as the external clock source.

In some embodiments, the clock source announcement 3 may also be referred to as a sixth clock source announcement. This is uniformly described herein, and details are not described below again.

S1308: When the terminal device determines the 5G system clock source corresponding to the clock source information 3 as the external clock source, the terminal device generates a clock synchronization packet, and sends the clock synchronization packet to the adjacent device of the terminal device. Correspondingly, the adjacent device of the terminal device receives the clock synchronization packet.

In other words, in this embodiment of this application, the terminal device may generate the clock synchronization packet to be sent to the adjacent device, and the UPF network element does not need to periodically generate the clock synchronization packet and then send the clock synchronization packet to the terminal device. Therefore, load of the UPF network element can be reduced.

It should be noted that, in this embodiment of this application, that the terminal device determines the 5G system clock source corresponding to the clock source information 3 as the external clock source may also be understood as that the terminal device determines the 5G system clock source corresponding to the clock source information 3 as an optimal clock source. This is uniformly described herein, and details are not described below again.

In some embodiments, the terminal device may determine, based on the indication information sent by the SMF network element, the 5G system clock source corresponding to the clock source information 3 as the external clock source. Alternatively, the terminal device may determine, based on an optimal clock source selection algorithm, the 5G system clock source corresponding to the clock source information 3 as the external clock source. This is not specifically limited in this embodiment of this application.

Based on the communication method provided in this embodiment of this application, because the terminal device may obtain clock source information of the 5G system from the UPF network element, in other words, the terminal device and the UPF network element may obtain the same 5G clock source information, when the 5G system is used as the clock source, the adjacent device of the terminal device and the adjacent device of the UPF network element may consider that the 5G system provides a same clock source for the outside. In addition, the 5G clock is opened, so that the clock source information of the 5G system is reported to the AF network element; and a third party may learn of the clock information of the 5G system, and the third party may flexibly use various clock sources based on deployment and application requirements. In other words, in this embodiment of this application, the 5G system clock may be opened to an external network, so that the clock can be released to the external network and a clock synchronization function can be provided based on a requirement of the external network. In addition, because in this embodiment of this application, the terminal device may generate the clock source announcement or the clock synchronization packet to be sent to the adjacent device, and the UPF network element does not need to periodically generate the clock source announcement or the clock synchronization packet and then send the clock source announcement or the clock synchronization packet to the terminal device, load of the UPF network element can be reduced.

The actions of the terminal device, the UPF network element, the AF network element, or the SMF network element in steps S1301 to S1308 may be performed by the processor 901 in the communication device 900 shown in FIG. 9 by invoking the application program code stored in the memory 903. This is not limited in this embodiment.

It should be noted that, the embodiments shown in FIG. 10 to FIG. 13 are all described by using an example in which a newly added adaptation function (for example, a DS-TT or an NW-TT) is deployed in the terminal device or the UPF network element. Certainly, if the newly added adaptation function is not deployed in the terminal device or the UPF network element, the foregoing embodiments are still applicable, and only some or all functions of the terminal device or the UPF network element need to be implemented in the DS-TT or the NW-TT. For example, when the terminal device and the DS-TT are separately deployed, in step S1306, the terminal device receives the clock source information 3, and then sends the clock source information 3 to the DS-TT by using an internal mechanism, and the DS-TT performs steps S1307 and S1308. This is uniformly described herein, and details are not described below again.

It may be understood that in the foregoing embodiments, the methods and/or steps implemented by the terminal device may alternatively be implemented by a component (for example, a chip or a circuit) that can be used for the terminal device; the methods and/or steps implemented by the user plane network element may alternatively be implemented by a component (for example, a chip or a circuit) that can be used for the user plane network element; the methods and/or steps implemented by the control plane network element may alternatively be implemented by a component (for example, a chip or a circuit) that can be used for the control plane network element; and the methods and/or steps implemented by the application function network element may also be implemented by a component (for example, a chip or a circuit) that can be used for the application function network element.

The foregoing mainly describes the solutions provided in embodiments of this application from a perspective of interaction between the network elements. Correspondingly, an embodiment of this application further provides a communication apparatus. The communication apparatus may be the terminal device in the foregoing method embodiments, an apparatus including the foregoing terminal device, or a component that can be used for the terminal device. Alternatively, the communication apparatus may be the user plane network element in the foregoing method embodiments, an apparatus including the foregoing user plane network element, or a component that can be used for the user plane network element. Alternatively, the communication apparatus may be the control plane network element in the foregoing method embodiments, an apparatus including the foregoing control plane network element, or a component that can be used for the control plane network element. Alternatively, the communication apparatus may be the application function network element in the foregoing method embodiments, an apparatus including the foregoing application function network element, or a component that can be used for the application function network element. It may be understood that, to implement the foregoing functions, the communication apparatus includes corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 14:
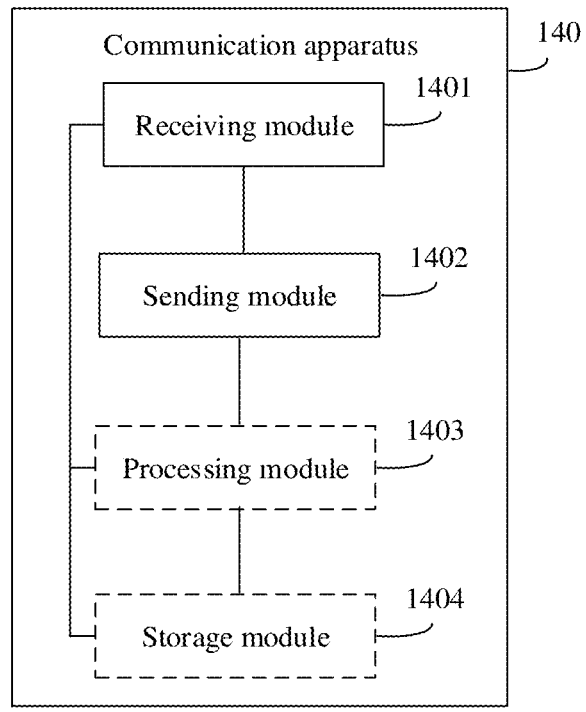
FIG. 14 is a schematic diagram 1 of a structure of a communication apparatus according to at least an embodiment of this application.

FIG. 14 is a schematic diagram of a structure of a communication apparatus 140. The communication apparatus 140 includes a receiving module 1401 and a sending module 1402. The receiving module 1401 may also be referred to as a receiving unit, and is configured to implement a receiving function. For example, the receiving module 1401 may be a receiver circuit, a receiver, a receiver, or a communication interface. The sending module 1402 may also be referred to as a sending unit, and is configured to implement a sending function. For example, the sending module 1402 may be a transmitter circuit, a transmitter, a transmitter, or a communication interface. Certainly, the receiving module 1401 and the sending module 1402 in this embodiment of this application may be integrated into a transceiver module. The transceiver module may also be referred to as a transceiver unit, to implement a transceiver function. For example, the transceiver module may be a transceiver circuit, a transceiver, a transceiver, or a communication interface. This is not specifically limited in this embodiment of this application. In some embodiments, as shown in FIG. 14, the communication apparatus may further include a processing module 1403 and/or a storage module 1404.

An example in which the communication apparatus 140 is the terminal device in the foregoing method embodiments, a chip disposed in the terminal device, or another component is used. In this case:

the receiving module 1401 is configured to receive first clock source information, where the first clock source information is clock source information of a wireless communication system; and the sending module 1402 is configured to send the first clock source information to an adjacent device.

In some embodiments, the receiving module 1401 is specifically configured to receive a first clock source announcement from a user plane network element, where the first clock source announcement includes the first clock source information.

In some embodiments, the sending module 1402 is specifically configured to send the first clock source announcement to the adjacent device.

In some embodiments, the processing module 1403 is configured to: when determining that the first clock source information is the clock source information of the wireless communication system, generate a second clock source announcement based on the first clock source information, where the second clock source announcement includes the first clock source information; and the sending module 1402 is further configured to send the second clock source announcement to the adjacent device.

In some embodiments, the processing module 1403 is configured to: when determining that the first clock source information is the clock source information of the wireless communication system, generate a third clock source announcement based on the first clock source information, where the third clock source announcement includes the first clock source information; and the sending module 1402 is specifically configured to send the third clock source announcement to the adjacent device.

In some embodiments, the storage module 1404 is configured to store the first clock source information or the first clock source announcement.

In some embodiments, the processing module 1403 is configured to: when determining that the first clock source information is the clock source information of the wireless communication system, and a clock source corresponding to the first clock source information is an optimal clock source, generate a clock synchronization packet; and the sending module 1402 is further configured to send the clock synchronization packet to the adjacent device.

In some embodiments, the first clock source announcement includes indication information, and the indication information indicates that the first clock source information is the clock source information of the wireless communication system; and the processing module 1403 is further configured to determine, based on the indication information, that the first clock source information is the clock source information of the wireless communication system.

In some embodiments, the processing module 1403 is further configured to determine, based on prestored characteristic information of the clock source information of the wireless communication system, that the first clock source information is the clock source information of the wireless communication system.

In some embodiments, the receiving module 1401 is further configured to receive a clock synchronization packet from the user plane network element, where the clock synchronization packet includes a first timestamp, and the first timestamp represents a moment at which the user plane network element sends the clock synchronization packet; the processing module 1403 is further configured to determine a forwarding delay of the clock synchronization packet in the wireless communication system based on the first timestamp and a moment at which the communication apparatus 140 forwards the clock synchronization packet; and the sending module 1402 is further configured to: after the processing module 1403 adds the forwarding delay to a correction field in the clock synchronization packet, send the clock synchronization packet to the adjacent device at the moment at which the communication apparatus 140 forwards the clock synchronization packet; or the sending module 1402 is further configured to send the clock synchronization packet to the adjacent device at the moment at which the communication apparatus 140 forwards the clock synchronization packet, where the first timestamp in the clock synchronization packet is updated to a second timestamp, and the second timestamp is determined based on the forwarding delay.

In some embodiments, the receiving module 1401 is further configured to receive a fourth clock source announcement from the adjacent device, where the fourth clock source announcement includes fourth clock source information, and the fourth clock source information is clock source information outside the wireless communication system; and the sending module 1402 is further configured to send the fourth clock source announcement to the user plane network element.

In some embodiments, the receiving module 1401 is further configured to receive a fifth clock source announcement from the adjacent device, where the fifth clock source announcement includes fifth clock source information, and the fifth clock source information is clock source information outside the wireless communication system; and the sending module 1402 is further configured to: when a clock source corresponding to the fifth clock source information is better than a clock source corresponding to the first clock source information, send the fifth clock source announcement to the user plane network element.

In another possible implementation, the receiving module 1401 is specifically configured to receive the first clock source information from a control plane network element.

In some embodiments, the processing module 1403 is configured to generate a sixth clock source announcement based on the first clock source information, where the sixth clock source announcement includes the first clock source information; and the sending module 1402 is specifically configured to send the sixth clock source announcement to the adjacent device.

In some embodiments, the processing module 1403 is configured to: when a clock source corresponding to the first clock source information is an optimal clock source, generate a clock synchronization packet, and send the clock synchronization packet to the adjacent device.

An example in which the communication apparatus 140 is the application function network element in the foregoing method embodiments, a chip disposed in the application function network element, or another component is used. In this case:

a receiving module 1401 is configured to receive seventh clock source information, where the seventh clock source information is a part or all of first clock source information, and the first clock source information is clock source information of a wireless communication system; and a sending module 1402 is configured to send the first clock source information to a user plane network element or a control plane network element.

In some embodiments, the processing module 1403 is configured to: when the seventh clock source information is a part of the first clock source information, determine the first clock source information.

In some embodiments, the processing module 1403 is specifically configured to determine the first clock source information based on one or more of the seventh clock source information, local configuration information, other clock source information, or application requirement information, where the other clock source information is clock source information outside the wireless communication system.

An example in which the communication apparatus 140 is the control plane network element in the foregoing method embodiments, a chip disposed in the control plane network element, or another component is used. In this case:

the receiving module 1401 is configured to receive first clock source information from an application function network element, where the first clock source information is clock source information of a wireless communication system; and the sending module 1402 is configured to send the first clock source information to a terminal device and/or a user plane network element.

In some embodiments, the sending module 1402 is further configured to send seventh clock source information to the application function network element, where the seventh clock source information is a part or all of the first clock source information.

In some embodiments, the receiving module 1401 is further configured to receive sixth clock source information from the user plane network element, where the sixth clock source information is a part or all of the seventh clock source information.

In some embodiments, the processing module 1403 is further configured to determine the seventh clock source information according to a local policy or a default rule.

All related content of the steps in the foregoing method embodiments may be cited in function descriptions of corresponding function modules. Details are not described herein again.

In this embodiment, the communication apparatus 140 is presented in a form of function modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 140 may be in a form of the communication device 900 shown in FIG. 9.

For example, the processor 901 in the communication device 900 shown in FIG. 9 may invoke the computer-executable instructions stored in the memory 903, to enable the communication device 900 to perform the communication method in the foregoing method embodiment.

Specifically, functions/implementation processes of the receiving module 1401, the sending module 1402, the processing module 1403, and the storage module 1404 in FIG. 14 may be implemented by the processor 901 in the communication device 900 shown in FIG. 9 by invoking the computer-executable instructions stored in the memory 903. Alternatively, a function/an implementation process of the processing module 1403 in FIG. 14 may be implemented by the processor 901 in the communication device 900 shown in FIG. 9 by invoking the computer-executable instructions stored in the memory 903; functions/implementation processes of the receiving module 1401 and the sending module 1402 in FIG. 14 may be implemented by the communication interface 904 in the communication device 900 shown in FIG. 9; and a function/an implementation process of the storage module 1404 in FIG. 14 may be implemented by using the memory 903 in the communication device 900 shown in FIG. 9.

Because the communication apparatus 140 provided in this embodiment may perform the communication methods provided in the embodiments shown in FIG. 10 to FIG. 13, for technical effects that can be achieved by the communication apparatus 140, refer to the embodiments shown in FIG. 10 to FIG. 13. Details are not described herein again.

Figure 15:
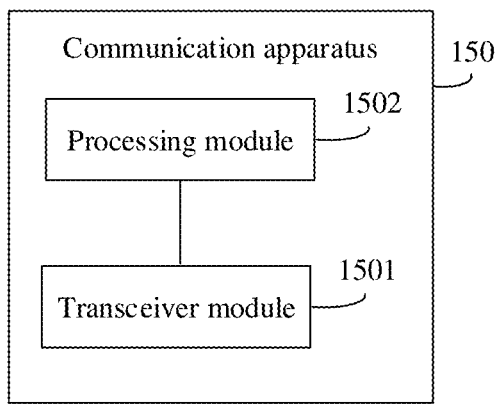
FIG. 15 is a schematic diagram 2 of a structure of a communication apparatus according to at least an embodiment of this application.

FIG. 15 is a schematic diagram of a structure of another communication apparatus 150. The communication apparatus 150 includes a transceiver module 1501 and a processing module 1502. The transceiver module 1501 may also be referred to as a transceiver unit, and is configured to implement a transceiver function. For example, the transceiver module 1501 may be a transceiver circuit, a transceiver, or a communication interface.

An example in which the communication apparatus 150 is the user plane network element in the foregoing method embodiments, a chip disposed in the user plane network element, or another component is used. In some embodiments, the processing module 1502 is configured to obtain first clock source information, where the first clock source information is clock source information of a wireless communication system; the processing module 1502 is further configured to generate a first clock source announcement based on the first clock source information, where the first clock source announcement includes the first clock source information; and the transceiver module 1501 is configured to send the first clock source announcement to a terminal device.

In some embodiments, that the processing module 1502 is configured to obtain the first clock source information includes: The processing module 1502 is configured to receive the first clock source information from an application function network element by using the transceiver module 1501.

In some embodiments, the processing module 1502 is further configured to: when determining that a clock source corresponding to the first clock source information is an optimal clock source, generate a clock synchronization packet; and the transceiver module 1501 is further configured to send the clock synchronization packet to the terminal device.

In some embodiments, the transceiver module 1501 is further configured to receive a fourth clock source announcement from the terminal device, where the fourth clock source announcement is sent by an adjacent device of the terminal device to the terminal device and then forwarded by the terminal device to the user plane network element, the fourth clock source announcement includes fourth clock source information, and the fourth clock source information is clock source information outside the wireless communication system.

In some embodiments, the transceiver module 1501 is further configured to receive a fifth clock source announcement from the terminal device, where the fifth clock source announcement is sent by an adjacent device of the terminal device to the terminal device, and then forwarded by the terminal device to the user plane network element when a clock source corresponding to the fifth clock source information is better than a clock source corresponding to the first clock source information, the fifth clock source announcement includes fifth clock source information, and the fifth clock source information is clock source information outside the wireless communication system.

In some embodiments, the transceiver module 1501 is further configured to send sixth clock source information, where the sixth clock source information is a part or all of the first clock source information.

Alternatively, an example in which the communication apparatus 150 is the user plane network element in the foregoing method embodiments, a chip disposed in the user plane network element, or another component is used. In this case, in some embodiments, the transceiver module 1501 is configured to receive first clock source information from an application function network element, where the first clock source information is the clock source information of the wireless communication system; the processing module 1502 is configured to generate a seventh clock source announcement based on the first clock source information, where the seventh clock source announcement includes the first clock source information; and the transceiver module 1501 is further configured to send the seventh clock source announcement to the adjacent device.

In some embodiments, the processing module 1502 is further configured to: when determining that the clock source corresponding to the first clock source information is the optimal clock source, generate a clock synchronization packet by the user plane network element; and the transceiver module 1501 is further configured to send the clock synchronization packet to the terminal device.

In some embodiments, the transceiver module 1501 is further configured to receive a fourth clock source announcement from the terminal device, where the fourth clock source announcement is sent by an adjacent device of the terminal device to the terminal device and then forwarded by the terminal device to the user plane network element, the fourth clock source announcement includes fourth clock source information, and the fourth clock source information is clock source information outside the wireless communication system.

In some embodiments, the transceiver module 1501 is further configured to receive a fifth clock source announcement from the terminal device, where the fifth clock source announcement is sent by an adjacent device of the terminal device to the terminal device, and then forwarded by the terminal device to the user plane network element when a clock source corresponding to the fifth clock source information is better than a clock source corresponding to the first clock source information, the fifth clock source announcement includes fifth clock source information, and the fifth clock source information is clock source information outside the wireless communication system.

In some embodiments, the transceiver module 1501 is further configured to send sixth clock source information, where the sixth clock source information is a part or all of the first clock source information.

All related content of the steps in the foregoing method embodiments may be cited in function descriptions of corresponding function modules. Details are not described herein again.

In this embodiment, the communication apparatus 150 is presented in a form of function modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 150 may be in a form of the communication device 900 shown in FIG. 9.

For example, the processor 901 in the communication device 900 shown in FIG. 9 may invoke the computer-executable instructions stored in the memory 903, to enable the communication device 900 to perform the communication method in the foregoing method embodiment.

Specifically, functions/implementation processes of the transceiver module 1501 and the processing module 1502 in FIG. 15 may be implemented by the processor 901 in the communication device 900 shown in FIG. 9 by invoking the computer-executable instructions stored in the memory 903. Alternatively, a function/an implementation process of the processing module 1502 in FIG. 15 may be implemented by the processor 901 in the communication device 900 shown in FIG. 9 by invoking the computer-executable instructions stored in the memory 903, and a function/an implementation process of the transceiver module 1501 in FIG. 15 may be implemented through the communication interface 904 in the communication device 900 shown in FIG. 9.

Because the communication apparatus 150 provided in this embodiment may perform the communication methods provided in the embodiments shown in FIG. 10 to FIG. 13, for technical effects that can be achieved by the communication apparatus 150, refer to the embodiments shown in FIG. 10 to FIG. 13. Details are not described herein again.

It should be noted that one or more of the foregoing modules or units may be implemented by using software, hardware, or a combination thereof. When any one of the foregoing modules or units is implemented by software, the software exists in a form of computer program instructions, and is stored in the memory. The processor may be configured to execute the program instructions and implement the foregoing method procedure. The processor may be built into a system-on-a-chip (SOC) or an ASIC, or may be an independent semiconductor chip. In addition to a core for executing software instructions to perform operations or processing, the processor may further include a hardware accelerator, for example, a field programmable gate array (FPGA), a programmable logic device (PLD), or a logic circuit that implements a special-purpose logic operation.

When the foregoing modules or units are implemented by using hardware, the hardware may be any one or any combination of a CPU, a microprocessor, a DSP chip, a MCU, an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

In some embodiments, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to instruct the communication apparatus to perform the method in any one of the foregoing method embodiments. Certainly, the memory may not be located in the communication apparatus. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions are generated according to the embodiments of this application. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. Clearly, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A communication method, the method comprising:
    receiving, by a terminal device, first clock source information, wherein the first clock source information corresponds to clock source information of a wireless communication system, wherein the first clock source information indicates that a fifth generation (5G) system clock is useable as a clock source;
    sending, by the terminal device, the first clock source information to an adjacent device;
    receiving, by the terminal device, a clock synchronization packet from a user plane network element, wherein the clock synchronization packet comprises a first timestamp, and the first timestamp represents a first time at which the user plane network element sends the clock synchronization packet;
    determining, by the terminal device, a forwarding delay of the clock synchronization packet in the wireless communication system based on the first timestamp and a second time at which the terminal device forwards the clock synchronization packet; and
    after adding the forwarding delay to a correction field in the clock synchronization packet, sending, by the terminal device, the clock synchronization packet to the adjacent device at the second time at which the terminal device forwards the clock synchronization packet.

2. The method according to claim 1, wherein receiving the first clock source information comprises:
    receiving, by the terminal device, a first clock source announcement from the user plane network element, wherein the first clock source announcement comprises the first clock source information.

3. The method according to claim 2, wherein sending the first clock source information to the adjacent device comprises:
    sending, by the terminal device, the first clock source announcement to the adjacent device.

4. The method according to claim 1, wherein receiving the first clock source information comprises:
    receiving, by the terminal device, the first clock source information from a control plane network element, wherein the control plane network element corresponds to a network exposure function network element.

5. The method according to claim 4, wherein sending the first clock source information to the adjacent device comprises:
    generating, by the terminal device, a sixth clock source announcement based on the first clock source information, wherein the sixth clock source announcement comprises the first clock source information; and
    sending, by the terminal device, the sixth clock source announcement to the adjacent device.

6. The method according to claim 4, the method further comprising:
    generating, by the terminal device, a clock synchronization packet in response to the clock source corresponding to the first clock source information is an optimal clock source, and
    sending the clock synchronization packet to the adjacent device.

7. A communication apparatus, comprising:
    an interface;
    a non-transitory memory configured to store non-transitory instructions; and
    at least one processor in communication with the interface and the non-transitory memory, and in response to being executed by the at least one processor, the non-transitory instructions cause the at least one processor to:
    receive, by the interface, first clock source information, wherein the first clock source information corresponds to clock source information of a wireless communication system, wherein the first clock source information indicates that a fifth generation (5G) system clock is useable as a clock source;
    send, by the interface, the first clock source information to an adjacent device;
    receive, by the interface, a clock synchronization packet from a user plane network element, wherein the clock synchronization packet comprises a first timestamp, and the first timestamp represents a first time at which the user plane network element sends the clock synchronization packet;

determine a forwarding delay of the clock synchronization packet in the wireless communication system based on the first timestamp and a second time at which the communication apparatus forwards the clock synchronization packet;

add the forwarding delay to a correction field in the clock synchronization packet; and send, by the interface, the clock synchronization packet to the adjacent device at the second time at which the communication apparatus forwards the clock synchronization packet.

8. The communication apparatus according to claim 7, wherein the non-transitory instructions that cause the at least one processor to receive the first clock source information comprises the at least one processor to:

receive, by the interface, first clock source announcement from the user plane network element, wherein the first clock source announcement comprises the first clock source information.

9. The communication apparatus according to claim 8, wherein the non-transitory instructions that cause the at least one processor to send the first clock source information to the adjacent device comprises the at least one processor to:

send, by the interface, the first clock source announcement to the adjacent device.

10. The communication apparatus according to claim 7, wherein the non-transitory instructions that cause the at least one processor to receive the first clock source information comprises the at least one processor to:

receive, by the interface, the first clock source information from a control plane network element, wherein the control plane network element corresponds to a network exposure function network element.

11. The communication apparatus according to claim 10, wherein the non-transitory instructions that cause the at least one processor to send the first clock source information to the adjacent device comprises the at least one processor to:

generate a sixth clock source announcement based on the first clock source information, wherein the sixth clock source announcement comprises the first clock source information; and send, by the interface, the sixth clock source announcement to the adjacent device.

12. The communication apparatus according to claim 10, wherein the non-transitory instructions further cause the at least one processor to:

generate a clock synchronization packet in response to the clock source corresponding to the first clock source information is an optimal clock source; and send, by the interface, the clock synchronization packet to the adjacent device.

13. A non-transitory computer-readable medium, wherein the non-transitory computer-readable storage medium comprises non-transitory instructions, and in response to the non-transitory instructions being executed by a processor, the processor is configured to perform at least one of:

receiving first clock source information, wherein the first clock source information corresponds to clock source information of a wireless communication system, wherein the first clock source information indicates that a fifth generation (5G) system clock is useable as a clock source;

sending the first clock source information to an adjacent device;

receiving a clock synchronization packet from a user plane network element, wherein the clock synchronization packet comprises a first timestamp, and the first timestamp represents a first time at which the user plane network element sends the clock synchronization packet;

determining a forwarding delay of the clock synchronization packet in the wireless communication system based on the first timestamp and a second time at which the terminal device forwards the clock synchronization packet; and after adding the forwarding delay to a correction field in the clock synchronization packet, sending the clock synchronization packet to the adjacent device at the second time at which the terminal device forwards the clock synchronization packet.

14. The non-transitory computer-readable medium according to claim 13, wherein the processor configured to perform receiving the first clock source information comprises the processor being configured to perform:

receiving a first clock source announcement from the user plane network element, wherein the first clock source announcement comprises the first clock source information; and the processor configured to perform sending the first clock source information to the adjacent device comprises the processor being configured to perform:

sending the first clock source announcement to the adjacent device.

15. The non-transitory computer-readable medium according to claim 13, wherein the processor configured to perform receiving the first clock source information comprises the processor being configured to perform:

receiving the first clock source information from a control plane network element, wherein the control plane network element corresponds to a network exposure function network element.

16. The non-transitory computer-readable medium according to claim 15, wherein the processor configured to perform sending the first clock source information to the adjacent device comprises the processor being configured to perform:

generating a sixth clock source announcement based on the first clock source information, wherein the sixth clock source announcement comprises the first clock source information; and sending the sixth clock source announcement to the adjacent device.

17. The non-transitory computer-readable medium according to claim 15, wherein the processor is further configured to perform at least one of:

generating a clock synchronization packet in response to the clock source corresponding to the first clock source information is an optimal clock source, and sending the clock synchronization packet to the adjacent device.

* * * * *